(12) United States Patent
Yazaki

(10) Patent No.: US 7,852,762 B2
(45) Date of Patent: Dec. 14, 2010

(54) SHAPING DEVICE AND ROUTER DEVICE

(75) Inventor: Takeki Yazaki, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 317 days.

(21) Appl. No.: 12/026,774

(22) Filed: Feb. 6, 2008

(65) Prior Publication Data
US 2008/0316924 A1 Dec. 25, 2008

(30) Foreign Application Priority Data
Jun. 20, 2007 (JP) ............................ 2007-162014

(51) Int. Cl.
H04L 12/26 (2006.01)
(52) U.S. Cl. .................... 370/230.1; 370/412; 709/234
(58) Field of Classification Search ...... 370/229–235.1, 370/390, 395.21, 395.41, 412, 413, 415, 370/417; 709/232–235
See application file for complete search history.

(56) References Cited

U.S. PATENT DOCUMENTS

| 6,532,213 B1 * | 3/2003 | Chiussi et al. ........... 370/230.1 |
| 6,633,540 B1 * | 10/2003 | Raisanen et al. ......... 370/230.1 |
| 6,687,225 B1 * | 2/2004 | Kawarai et al. .......... 370/230.1 |
| 2001/0014081 A1 * | 8/2001 | Kawasaki et al. ........... 370/235 |
| 2003/0012197 A1 * | 1/2003 | Yazaki et al. ............... 370/235 |
| 2005/0207417 A1 * | 9/2005 | Ogawa et al. ............... 370/390 |
| 2007/0121627 A1 * | 5/2007 | Chen .......................... 370/390 |
| 2008/0068992 A1 * | 3/2008 | Xie et al. .................... 370/230 |

FOREIGN PATENT DOCUMENTS

JP 6-315034 11/1994

OTHER PUBLICATIONS

IETF RFC3376, Internet Group Management Protocol Version 3.
S. Golestani, "A Self-Clocked Fair Queueing Scheme for Broadband Applications", Proc. of INFOCOM 94, 1994, pp. 636-646.
IETF RFC3810, Multicast Listener Discovery Version 2 (MLDv2) for IPv6.
http://www.cisco.com/warp/public/473/22.html, "Multicast in a Campus Network: CGMP and IGMP Snooping".

* cited by examiner

Primary Examiner—Kwang B Yao
Assistant Examiner—Jeffrey M Rutkowski
(74) Attorney, Agent, or Firm—Mattingly & Malur, P.C.

(57) ABSTRACT

A shaping unit includes FIFOs for accumulating a packet which is so designed as to arrive at a destination address. A packet (an ordinary packet), which has one destination address, is accumulated into the FIFO corresponding to the one destination address. A packet (a virtual multicast packet), which will be copied in the downstream of the shaping unit to arrive at two destination addresses, is accumulated into either of the FIFOs. A packet read unit transmits the virtual multicast packet, which is read from either of the FIFOs, and the ordinary packet, which is read from the one of the FIFOs, to a multiplexing circuit in such a manner that the total bandwidth of both packets is controlled.

8 Claims, 17 Drawing Sheets

SHAPING DEVICE AND ROUTER DEVICE

INCORPORATION BY REFERENCE

The present application claims priority from Japanese application JP 2007-162014 filed on Jun. 20, 2007, the content of which is hereby incorporated by reference into this application.

BACKGROUND OF THE INVENTION

1. Field of the Invention

The present invention relates to a shaping device and router device for controlling bandwidth of a packet flowing on a network.

2. Description of the Related Art

In the packet-based communications scheme used on an IP network, a large number of users can co-use the same line. This feature makes it possible to lower the per-bandwidth cost. On account of this low-cost property of the packet-based communications scheme, there has been a growing trend that telephone network and business network of each enterprise be implemented using the IP network. Here, conventionally, these telephone networks and business networks have been implemented using a network which is specifically designed therefor. On account of this trend, the IP network is now required to ensure the communications quality for voice data or mission critical data, which has been implemented using the specifically-designed network.

The ensuring of the communications quality requires that packet repeater devices which constitute the IP network be equipped with a communications-quality control function for ensuring the communications quality of the voice data or mission critical data. In regards to the communications-quality control function, there has been known, e.g., a shaping function. In JP-A-6-315034, the disclosure has been made concerning a shaping device for executing the shaping function. The shaping device disclosed in the present document is equipped with a queue for accumulating cells, i.e., fixed-length packets, for each connection (VC (Virtual Connection)). The shaping device transmits the packets from the queue with bandwidths set in advance for each VC, thereby ensuring the bandwidths for each VC. For example, a manager of the IP network locates the shaping device, to which the present technology is applied, on a line onto which traffic is concentrated, thereby allocating the VCs to the voice data or mission critical data. This allocation allows the manager to ensure the communications quality for the present data.

As for another shaping device, there has been known a shaping device based on a WFQ (Weighted Fair Queuing) scheme. In S. Golestani, "A Self-Clocked Fair Queuing Scheme for Broadband Applications", In proc. of INFO-COM' 94, pp. 636-646, 1994, the description has been given concerning a WFQ shaping device which is based on an algorithm referred to as "SCFQ (Self-Clocked Fair Queuing)". The shaping device described in the present document manages a plurality of sessions k (=1—N), and is equipped with a weight Wk for each session k. When an i-th packet $p\_k\_i$ arrives at the shaping device, the shaping device accumulates this arrival packet $p\_k\_i$ into the queue. Simultaneously, based on the Expression given below, the shaping device calculates a variable $F\_k\_i$ for each packet $p\_k\_i$ as follows:

$$F\_k\_i = L\_k\_i/Wk + \max(F\_k\_(i-1), V(ta\_k\_i)).$$

Here, $L\_k\_i$ denotes packet length of the packet $p\_k\_ta\_k\_i$ denotes arrival point-in-time of the packet $p\_k\_i$, and V(t) denotes a function for returning the value of $F\_k\_i$ of a packet outputted at a point-in-time t. At the packet-outputting time, the shaping device outputs a packet $p\_k\_i$ having the minimum $F\_k\_i$, thereby implementing the packet output which is proportional to the weight Wk for each session k. For example, the manager of the IP network allocates one session k to the voice data or mission critical data, thereby ensuring a bandwidth by the amount of Wk/(total of Wk)×line bandwidth. This allocation allows the manager to ensure the communications quality for the present data.

Meanwhile, there has been increasing use of IP multicast communication in order to implement contents delivery whose targets are set for a plurality of recipients on the IP network. The IP multicast communication is a communication scheme suitable for delivering the same data to a plurality of clients. In the case of using the unicast communication, i.e., a one-to-one communication, a server must transmit data repeatedly according to the number of clients. In contrast thereto, in the IP multicast communication, a packet transmitted from a server is copied at a node existing halfway to the clients. Accordingly, it is enough to send just one packet from the server to the node. This feature allows effective utilization of network resources existing between the server and the node.

In the IP multicast communication, a client that wishes to receive data (i.e., packet) transmits a join message to a router existing upstream. The join message is a message for requesting to join into a group of clients that are qualified to receive the data. As specifications for the join message, there exist ones such as, e.g., IGMPv3 (Internet Group Management Protocol, Version 3) described in "IETF REC3376, Internet Group Management Protocol, Version 3", and MLDv2 (Multicast Listener Discovery, Version 2) described in "IETF REC3810, Multicast Listener Discovery, Version 2 (MLDv2) for IPv6". Multicast IP addresses for storing the group that the client is to join are described in the join message. Having received the join message, the router memorizes networks attaining to the clients and the multicast IP addresses within the message in a manner corresponding to each other. Having inputted a multicast packet therein, the router extracts the multicast IP address described in a destination IP address field of the packet header. Then, the router copies and transfers the data (i.e., packet) to the network corresponding to the multicast IP address.

Meanwhile, when halting the data reception, the client transmits a leave message to the router.

Concerning leave messages of IGMPv3 and MLDv2, the description has been given in the above-described "IETF REC3376, Internet Group Management Protocol, Version 3", and "IETF REC3810, Multicast Listener Discovery, Version 2 (MLDv2) for IPv6". The multicast IP addresses for storing the group that the client is to leave are described in the leave message. The router releases the correspondence relationship established between the multicast IP address within the message and the network attaining to the client, thereby halting the copy of the data (i.e., packet).

The packet copied onto the respective networks by the router is transferred to the clients via a switch. The switch that has received the packet, based on its broadcast function, transmits the multicast packet to all of the lines belonging to the networks. A client that has joined the group qualified to receive the packet receives the present packet; whereas a client that has not joined the group discards the packet.

In the multicast delivery using the broadcast function, there exists the following problem: A packet is transferred to a client that need not receive the packet, and thus the bandwidth of the corresponding network is consumed wastefully. As a method for solving the present problem, there exists the IGMP snooping described in "Multicast in a Campus Network: CGMP and IGMP Snooping". In "Multicast in a Campus Network: CGMP and IGMP Snooping", the description has been given as follows: When the switch receives an IGMP join message into a certain group, the switch adds a line attaining to a client that has received the message to an address list of the group. Accordingly, it turns out that, when the switch receives a packet addressed to the group, the switch transfers the packet onto only the lines described in the address list. This selective packet output performed by the switch prevents the packet copy onto a line on which no client exists.

SUMMARY OF THE INVENTION

Consideration is given to the following case: The shaping device, which is described in JP-A-6-315034 or in S. Golestani, "A Self-Clocked Fair Queuing Scheme for Broadband Applications", In proc. of INFOCOM' 94, pp. 636-646, 1994, transmits a packet. Next, a downstream node receives the present packet. Moreover, the downstream node carries out a multicast copy of the packet, thereby transferring the packet to a plurality of destinations. At this time, the shaping device suffers from a problem that the shaping device is incapable of controlling the total bandwidth of the packet which will arrive at the plurality of destinations. Hereinafter, referring to a network illustrated in FIG. 3, the concrete explanation will be given below concerning the present problem.

The network illustrated in FIG. 3 is a network where a headquarter-office site 902, a branch-office site A903, and a branch-office site B904 of a certain enterprise are connected to each other by a carrier network 901 provided by a carrier. 10 Mbps is guaranteed as the bandwidth between the carrier network 901 and the branch-office site A903. 5 Mbps is guaranteed as the bandwidth between the carrier network 901 and the branch-office site B904. A terminal 911 and a terminal 912 of the headquarter-office site 902 transmit unicast packets to a terminal 921 of the branch-office site A903 and a terminal 931 of the branch-office site B904 (these transmissions are equivalent to the dashed lines). A server 910 of the headquarter-office site 902 transmits a multicast packet, which, eventually, will reach both a terminal 922 of the branch-office site A903 and a terminal 932 of the branch-office site B904 (these transmissions are equivalent to the solid lines). This multicast packet is copied at a switch 900 of the carrier network 901, thus arriving at the terminal 922 and the terminal 932 finally.

At this time, in the shaping device of a router 200 positioned at the headquarter-office site 902, the copy of the multicast packet performed at the switch 900 is not taken into consideration. As a result, the shaping device finds it impossible to transmit the packets in such a manner that bandwidths of the packets from the carrier network 901 to the branch-office site A903 and bandwidths of the packets from the carrier network 901 to the branch-office site B904 are controlled at values lower than 10 Mbps and 5 Mbps respectively, i.e., the contract bandwidths. On account of this, there exists a possibility that a packet whose bandwidth has exceeded the contract bandwidths may occur, and that this packet will be discarded in the carrier network 901.

Also, no description has been given regarding a unit or method for solving the present problem in "IETF REC3376, Internet Group Management Protocol, Version 3", "IETF REC3810, Multicast Listener Discovery, Version 2 (MLDv2) for IPv6", and "Multicast in a Campus Network: CGMP and IGMP Snooping" as well.

In order to solve the above-described problem, a shaping device of the present invention is a shaping device for outputting a received packet in such a manner that bandwidth of the received packet is controlled at a set bandwidth, the shaping device including a buffer unit for accumulating the received packet, and a packet read unit for reading the packet accumulated into the buffer unit, wherein the packet read unit reads the packet in such a manner that the bandwidth of the packet is controlled at a bandwidth, the bandwidth being set for each of a plurality of destination addresses at which the one packet to be outputted will arrive.

The other problems to be solved by the present invention and the other solving units or methods therefor will become apparent from the following description of the invention of the present application and the accompanying drawings associated therewith.

According to the shaping device of the present invention, it becomes possible to control the total bandwidth of a packet which will arrive at a plurality of destinations while a downstream node of the shaping device is carrying out a multicast copy of the packet and transferring the packet onto a plurality of lines.

DESCRIPTION OF THE INVENTION

Hereinafter, referring to FIG. 1 through FIG. 22, the explanation will be given below concerning preferred embodiments of the present invention. The present invention, however, is not limited to these embodiments.

Network Configuration

Figure 3:
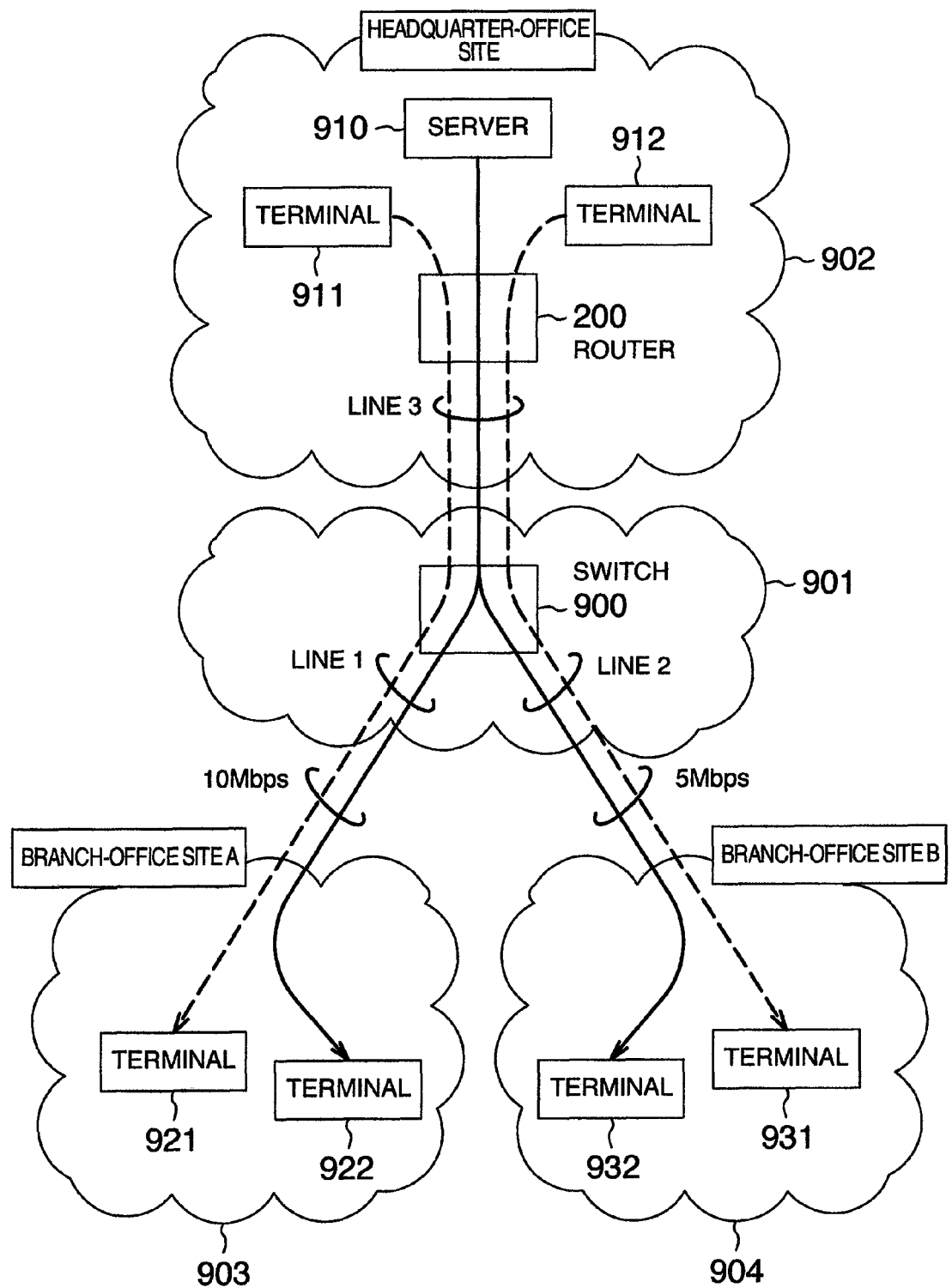
FIG. 3 illustrates the network assumed in the present invention.

Referring to FIG. 3, the explanation will be given below regarding a network assumed in the present invention. The network illustrated in FIG. 3 is a network where a headquarter-office site 902, a branch-office site A903, and a branch-office site B904 of a certain enterprise are connected to each other by a carrier network 901 provided by a carrier. 10 Mbps is guaranteed as the bandwidth between the carrier network 901 and the branch-office site A903. 5 Mbps is guaranteed as the bandwidth between the carrier network 901 and the branch-office site B904.

A terminal 911 and a terminal 912 of the headquarter-office site 902 transmit unicast packets to a terminal 921 of the branch-office site A903 and a terminal 931 of the branch-office site B904 (these transmissions are equivalent to the dashed lines). A server 910 of the headquarter-office site 902 transmits a multicast packet toward a terminal 922 of the branch-office site A903 and a terminal 932 of the branch-office site B904 (these transmissions are equivalent to the solid lines). When a router 200 of the present invention receives the unicast packets from the terminals 911 and 912 and the multicast packet from the server 910, the router 200 transfers these packets to the carrier network 901. Meanwhile, when a switch 900 receives the unicast packets, the switch 900 transmits the unicast packets to output lines attaining to the terminals corresponding thereto. Also, when the switch 900 receives the multicast packet, the switch 900 copies and transmits the multicast packet to the line 1 and the line 2, i.e., the output lines attaining to the terminal 922 and the terminal 932.

The router 200 is equipped with the shaping function which characteristic of the present invention. This shaping function controls the bandwidths of the packets from the carrier network 901 to the branch-office site A903 (i.e., the unicast packet from the terminal 911 to the terminal 921 and the multicast packet from the server 910 to the terminal 922) into values lower than 10 Mbps, i.e., the contract bandwidth. This bandwidth control allows prevention of the packet discarding within the carrier network 901. Similarly, the present shaping function controls bandwidths of the packets from the carrier network 901 to the branch-office site B904 (i.e., the unicast packet from the terminal 912 to the terminal 931 and the multicast packet from the server 910 to the terminal 932) into values lower than 5 Mbps, i.e., the contract bandwidth.

Communications Processing for Multicast Packet

The multicast-packet communication is constituted by the following two phases: Hereinafter, the detailed explanation will be given below concerning each phase.

(Phase 1) A phase in which reception of the multicast packet of a particular group is requested from the terminals.

(Phase 2) A phase in which the multicast packet is delivered from the server.

Phase 1

Figure 4:
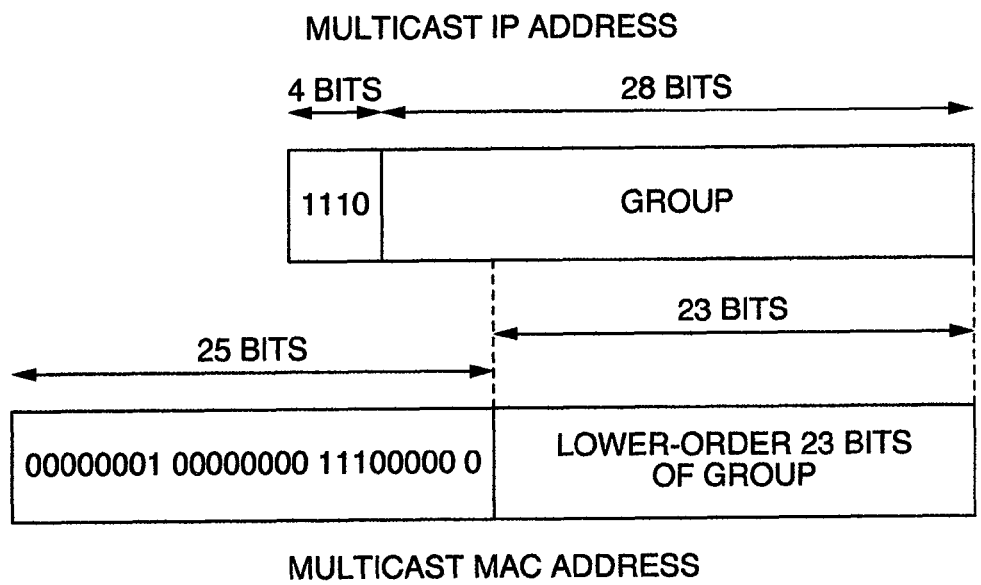
FIG. 4 illustrates the format of a multicast IP address and format of a multicast MAC address.

In order to receive the multicast packet of a particular group which the server 910 will transmit, the terminal 922 and the terminal 932 store, into a join message, a multicast IP address where the group information is described. Then, these terminals transmit the join message to the router 200. FIG. 4 illustrates format of a multicast IP address of IPv4. The information on the group is described in the lower-order 28 bits of the multicast IP address. The higher-order 4 bits always remain '1110'.

Figure 5:
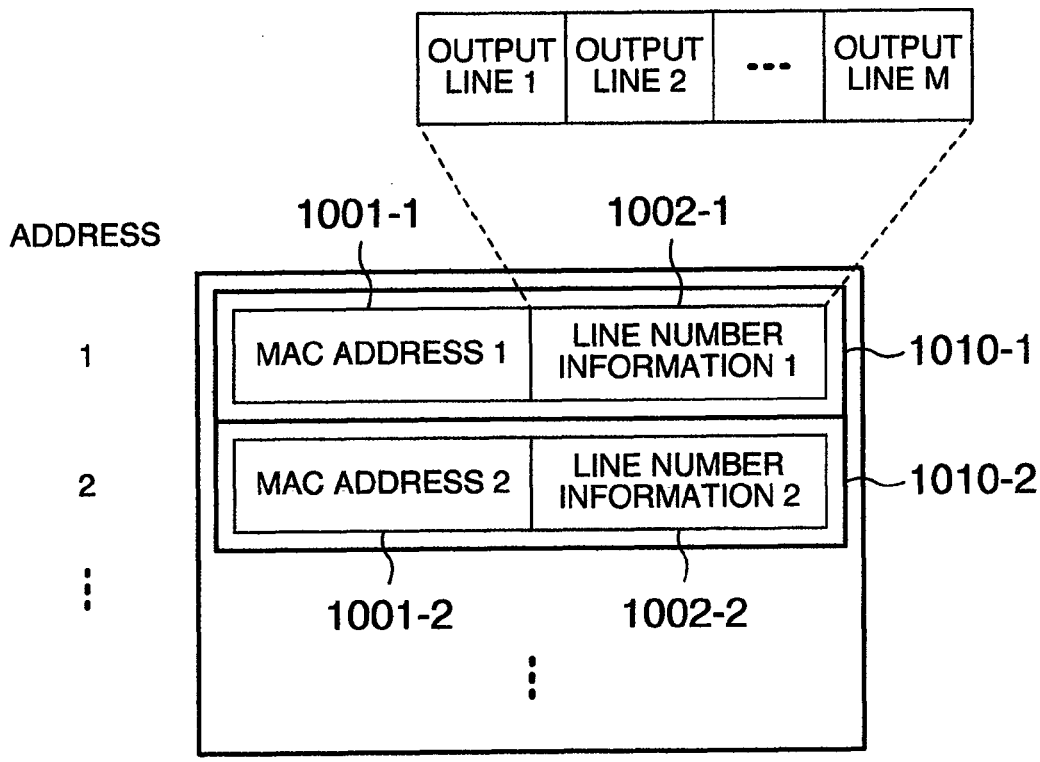
FIG. 5 illustrates an embodiment of a configuration of a FDB 1000.

The switch 900, which exists halfway to the router 200, transfers the join message to the router 200. Simultaneously, the switch 900 carries out the snooping described in "Multicast in a Campus Network: CGMP and IGMP Snooping". Referring to FIG. 4 and FIG. 5, the explanation will be given below regarding this snooping. FIG. 4 illustrates the relationship between the multicast IP address and a multicast MAC address in the case of IPv4. The lower-order 23 bits of the multicast MAC address are the same as the lower-order 23 bits of the multicast IP address in the case of IPv4. The higher-order 25 bits of the multicast MAC address become equal to a fixed value described in FIG. 4. Meanwhile, FIG. 5 illustrates an embodiment of the format of a FDB (Filtering Database) 1000 which is the database designed for the packet transfer. The FDB 1000 stores therein a plurality of entries 1010. Each entry 1010 includes line number information 1002 corresponding to the MAC address 1001. Each line number information 1002 is constituted by bits ('1' represents an output) for indicating the presence or absence of the output of a packet to each output line k (k=1~M) constituting the switch 900. In the snooping, first, the presence or absence of an entry 1010 is judged which describes therein a MAC address created from the multicast IP address within the join message. This judgment is implemented by the switch 900 making a comparison between the MAC address 1001 and the created destination MAC address to confirm the coincidence therebetween.

If the entry 1010 in which the coincidence holds is absent, an entry 1010 is registered in which the destination MAC address is replaced by the MAC address 1001 within the FDB 1000. At this time, the bit of the line number information 1002 corresponding to a line into which the join message has been inputted is set at '1', and the other bits are set at '0'. When the join message is received from the terminal 921 and the terminal 931, the bit of the line number corresponding to each of the line 1 and the line 2 is set at '1'. Meanwhile, if the entry 1010 in which the coincidence holds is present, of the bits of the line number information 1002 of the entry 1010, the bit corresponding to the line into which the join message has been inputted is set at '1'.

Figure 6:
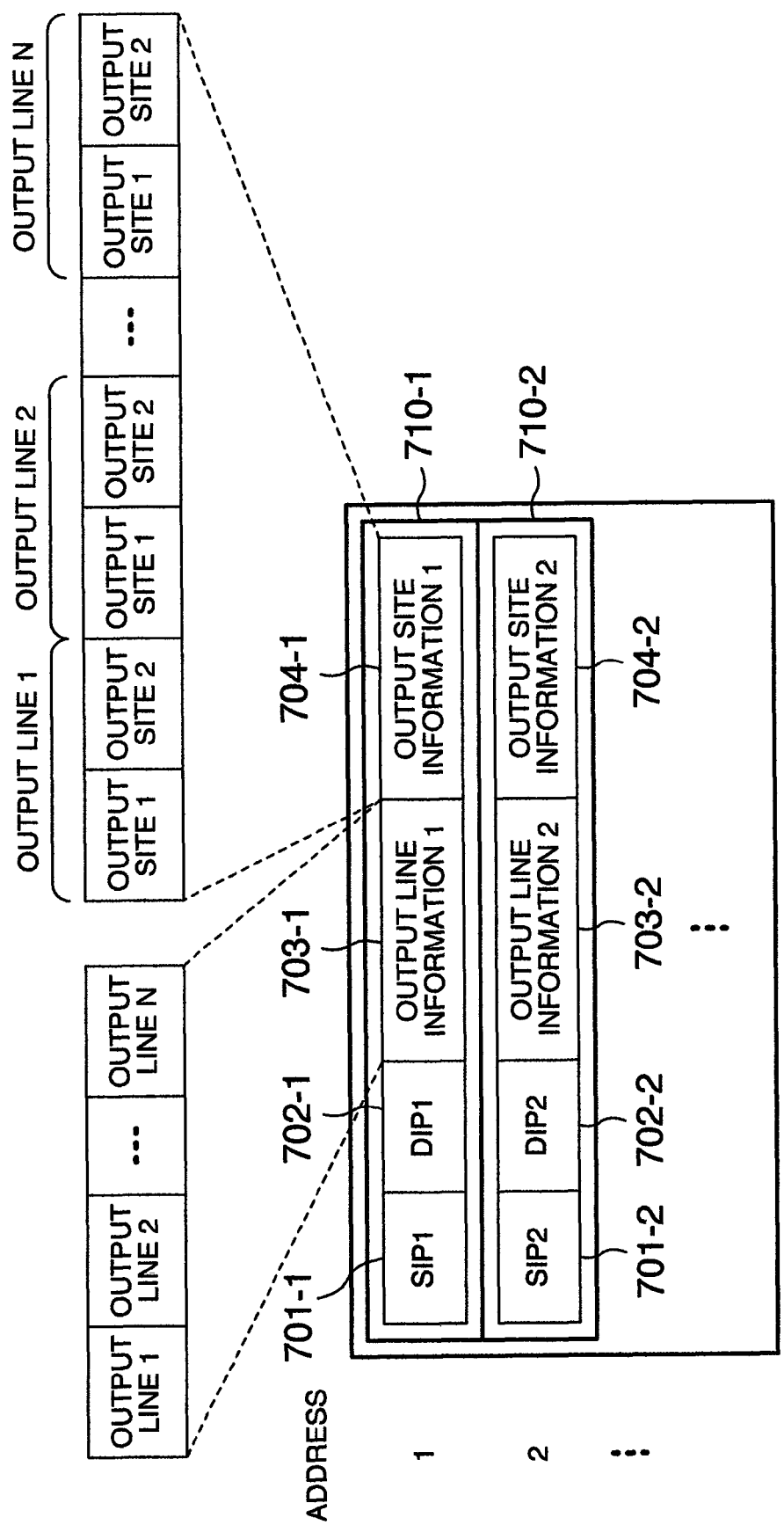
FIG. 6 illustrates an embodiment of a multicast routing table 700.

Having received the join message, the router 200 carries out setting a multicast routing table. FIG. 6 illustrates an embodiment of the multicast routing table 700. The multicast routing table 700 stores therein a plurality of entries 710-$j$. Each entry 710-$j$ includes SIP 701, i.e., condition on Source IP Address, DIP 702, i.e., condition on Destination IP Address, and output line information 703 and output site information 704 corresponding to these SIP 701 and DIP 702. Each output line information 703 is constituted by bits ('1' represents an output) for indicating the presence or absence of the output of a packet to each output line i (i=1~N) constituting the router 200. Also, each output site information 704 is constituted by bits ('1' represents an output) for indicating the presence or absence of the arrival of the multicast packet to each site, the multicast packet being outputted to each output line. Each output site information 704 in the present embodiment is constituted by each bit of an output site 1 and each bit of an output site 2. In the case illustrated in FIG. 3, the output sites 1 and 2 of the output line 3 correspond to the branch-office site A and the branch-office site B, respectively.

In the setting of the present multicast routing table, first, the router 200 searches for an entry 710 in which the multicast IP address within the join message (refer to FIG. 4) and the IP address of the server 910 coincide with the DIP 702 and the SIP 701, respectively. Hereinafter, the explanation will be given below concerning a processing in accordance with the presence or absence of the entry 710 in which the coincidence holds.

If the Entry 710 is Present

If the entry 710 in which the coincidence holds is present, of the bits of the output line information 703 of the entry 710, the bit corresponding to a line into which the join message has been inputted is set at '1'. The present setting allows the router 200 to transfer the multicast packet from the server 910 to the output line 3. Moreover, based on the information within the join message, a branch-office site is judged to which a terminal that has transmitted the join message belongs. Then, the bit of the output site information of the corresponding output line is set at '1'. For example, if the IP addresses used by the branch-office sites A and B are determined in advance, the source IP address within the join message makes it possible to judge the branch-office site that has transmitted the join message. Also, the value of a DSCP field used by each branch-office site is determined in advance, and the judgment may be made based on this value. The present setting makes it possible to grasp to which sites the multicast packet will be finally transferred in the copied manner, after the router 200 has transferred the multicast packet from the server 910 to the output line 3.

If the Entry 710 is Absent

If the entry 710 in which the coincidence holds is absent, an entry 710 is newly created in which the multicast IP address within the join message and the IP address of the server 910 are provided within the DIP 702 and the SIP 701. Also, the bit of the output line information 703 corresponding to the line into which the join message has been inputted is set at '1', and the other bits are set at '0'. Moreover, based on the information within the join message, the branch-office site that has transmitted the join message is judged. Then, the bit of the output site information 704 of the corresponding output line is set at '1'.

The router 200 carries out the processing, thereby, making it possible to set the multicast routing table 700 for transferring the multicast packet from the server 910.

Figure 7:
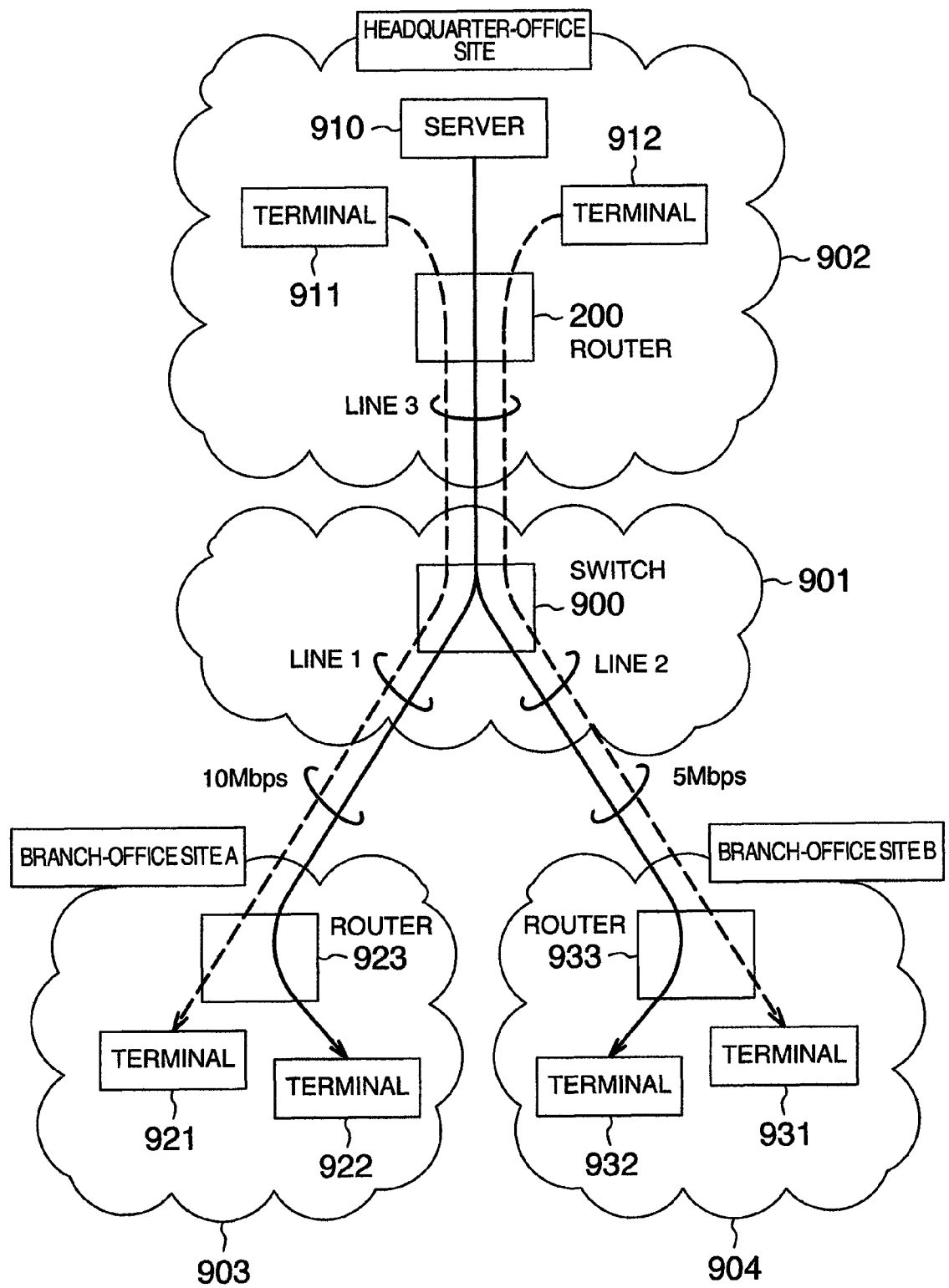
FIG. 7 illustrates a network assumed in the present invention.

Next, the explanation will be given below regarding the following case: Namely, as illustrated in FIG. 7, a router 923 and a router 933 are set up at entrance/exit of the branch-office site A903 and that of the branch-office site B904. As a result, the carrier network 901 and the branch-office site A903 and the branch-office site B904 become different networks from each other. In the network illustrated in FIG. 7, the router 923 and the router 933 receive the join/leave messages from the terminals. Each router then transmits, to the router 200, another message describing therein the multicast IP address within the join message. At this time, it is advisable enough for the switch 900 and the router 200 to set/set-release the FDB 1000 and the multicast routing table 700 using the multicast IP address within another message. There have also been known messages such as PIM-Join message of PIM-SSM (Protocol-Independent Multicast-Source Specific Multicast). In the following embodiments, the explanation will be given in the manner of being limited to the join message that a terminal has transmitted. A similar processing, however, is also executable using another message that the router transmits.

Phase 2

In the present phase, the server 910 transmits the multicast packet to the terminal 922 and the terminal 932. At this time, the destination IP address and the source IP address of the multicast packet become the multicast IP address corresponding to the group which the terminals have joined and the IP address of the server 910, respectively. Also, the destination MAC address becomes a MAC address created from the destination IP address.

Having received the multicast packet, the router 200 makes a comparison between the source IP address and the destination IP address within the multicast packet and the SIP 701 and the DIP 702 of the multicast routing table 700 respectively, thereby confirming the coincidence therebetween. Then, the router 200 transfers the multicast packet in accordance with the output line information 703 corresponding to an entry 710 in which the coincidence holds. In the network illustrated in FIG. 3, the router 200 transmits the multicast packet to the carrier network 901 alone. At this time, from the output site information 704 within the entry 710 in which the coincidence holds, the router 200 recognizes that the sites to which the multicast packet will be finally transferred are the branch-office site A and the branch-office site B. Then, the router 200 transmits the unicast packets and the multicast packet in such a manner that the total bandwidth of the unicast packet and the multicast packet from the carrier network 901 to the branch-office site A and the total bandwidth of the unicast packet and the multicast packet from the carrier network 901 to the branch-office site B are controlled at values lower than 10 Mbps and 5 Mbps, respectively.

Having received the multicast packet, the switch 900 makes a comparison between the destination MAC address within the multicast packet and the MAC address 1001 of the FDB 1000. Then, the switch 900 transfers the multicast packet in accordance with the line number information 1002 within the entry 1010 in which the coincidence holds.

Overview of the Router Operation

Hereinafter, the explanation will be given below concerning overview operation of the router 200 equipped with the shaping function in the present embodiment. Incidentally, in the router 200 in the present embodiment, a packet which is to be multicast-copied at a downstream node will be referred to as a "virtual multicast packet" (which is equivalent to the solid lines in FIG. 3), and a packet other than this packet will be referred to as an "ordinary packet" (which is equivalent to the dashed lines in FIG. 3).

Figure 2:
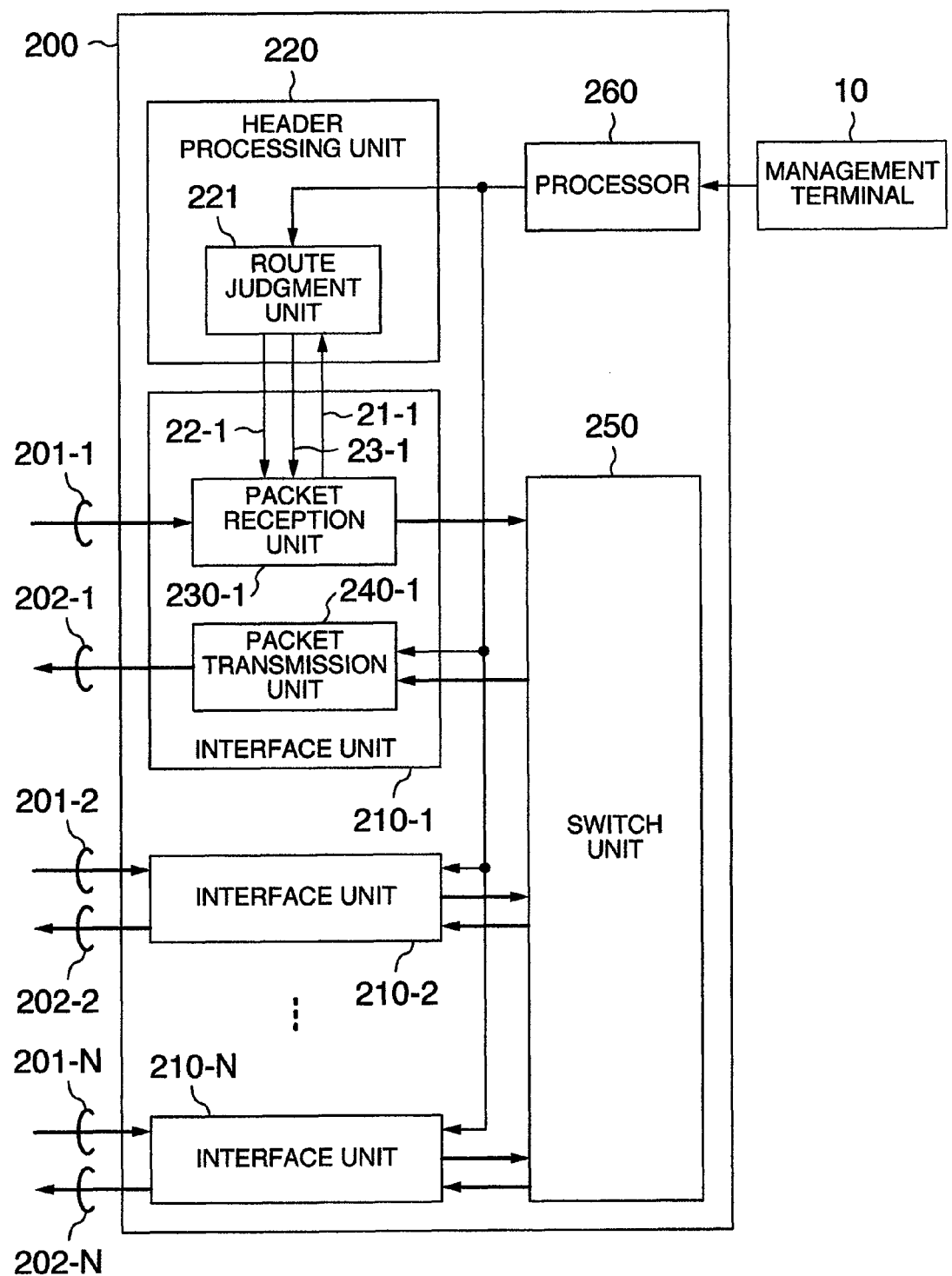
FIG. 2 illustrates an embodiment of a configuration of a router 200.

The router 200 in FIG. 2 includes N input lines 201-$i$ ($i=1\sim N$) for inputting a packet therein, N output lines 202-$i$ ($i=1\sim N$) for outputting the packet therefrom, N interface units 210-$i$ ($i=1\sim N$), a switch unit 250 for connecting the N interface units 210-$i$ to each other, a header processing unit 220, and a processor 260. The interface unit 210-$i$ includes a packet reception unit 230-$i$ for performing a reception processing of the packet received from the input line 201-$i$, and a packet transmission unit 240-*i* for performing a transmission processing of the packet transmitted to the output line 202-*i*. The header processing unit 220 includes a route judgment unit 221 for judging 'j', i.e., the number of the one or plural output lines 202-*j*, based on information such as header information of the packet inputted from the input line 201-*i*.

Figure 8:
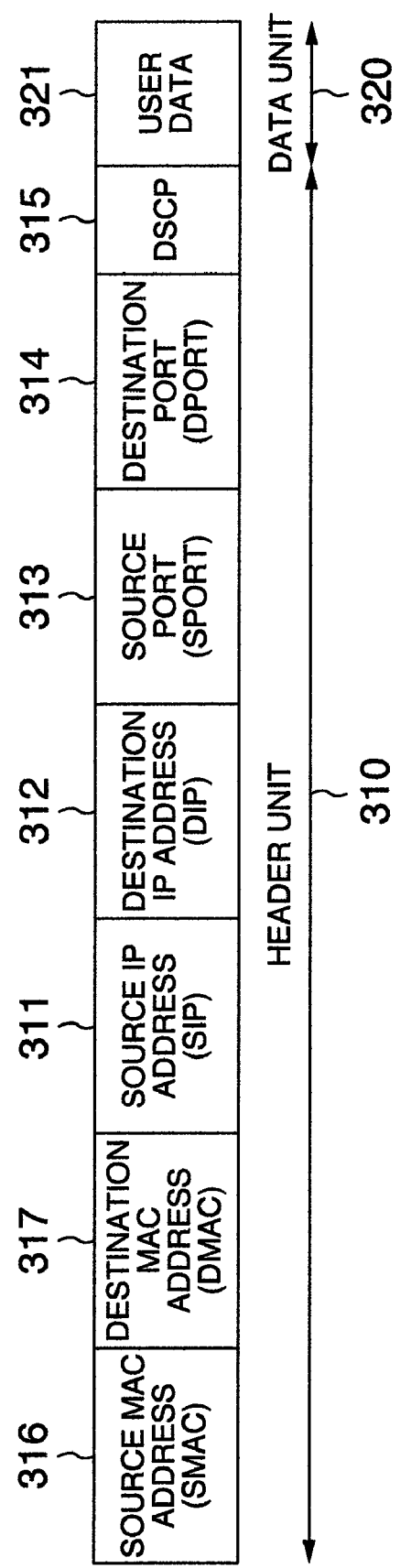
FIG. 8 illustrates an embodiment of a format of a packet transmitted/received by the router 200.

FIG. 8 illustrates an embodiment of format of the packet inputted from the input line 201-*i*. The present format is constituted by a header unit 310 and a data unit 320. The header unit 310 includes Source MAC Address 316 (which, hereinafter, will be referred to as "SMAC"), i.e., source address of Data Link later, Destination MAC Address 317 (hereinafter, referred to as "DMAC"), i.e., destination address of Data Link later, Source IP Address 311 (hereinafter, referred to as "SIP"), i.e., source address (address of transmission terminal) of Network later, Destination IP Address 312 (hereinafter, referred to as "DIP"), i.e., destination address (address of reception terminal) of Network later, Source Port 313 (hereinafter, referred to as "SPORT") and Destination Port 314 (hereinafter, referred to as "DPORT") indicating protocols (=higher-order applications), and DSCP 315 for indicating transfer precedence within the network. Also, the data unit 320 includes user data 321.

Figure 9:
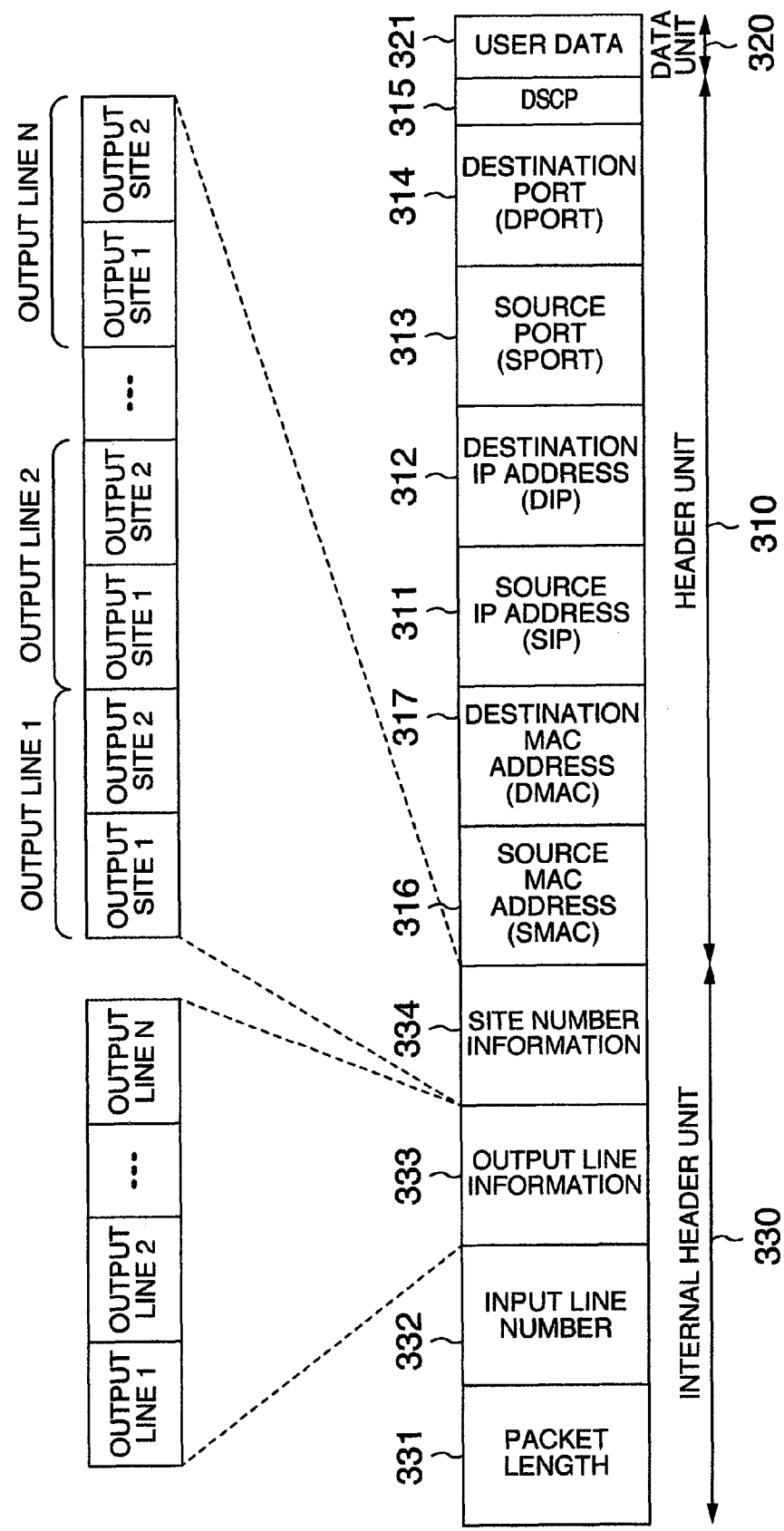
FIG. 9 illustrates an embodiment of the format of the packet inside the router 200.
Figure 10:
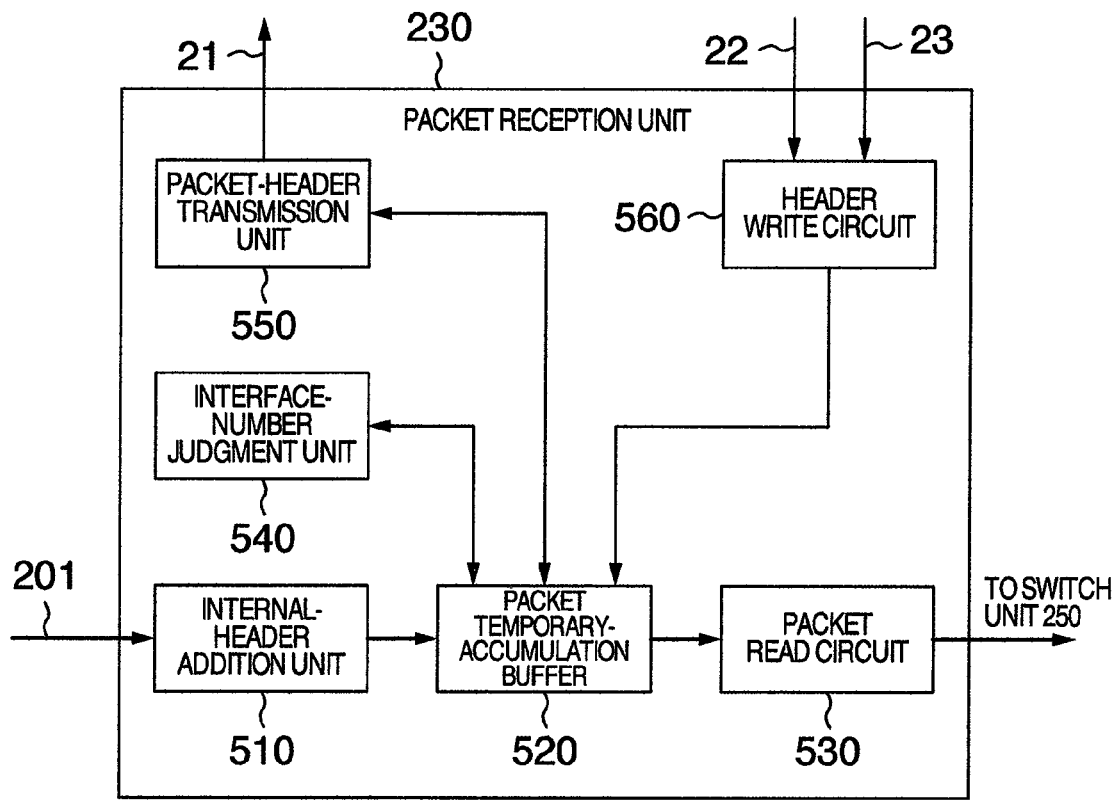
FIG. 10 illustrates an embodiment of a configuration of a packet reception unit 230.

FIG. 9 illustrates an embodiment of the format of the packet inside the router 200. The present format is constituted by adding an internal header unit 330 to the format illustrated in FIG. 8. This internal header unit 330 includes packet length 331 for indicating the packet length of an inputted packet, input line number 332, i.e., the number of a line into which the packet has been inputted, output line information 333 for storing an output line of the packet, and site number information 334 for storing sites at which the packet will arrive. The output line information 333 includes bits each of which corresponds to each output line. '1' is described therein when outputting the packet to each output line; while '0' is described therein when not outputting the packet thereto. Also, the site number information 334 includes bits each of which corresponds to each site of each output line. '1' is described therein if the packet outputted to each output line will arrive at each site; while '0' is described therein if the packet will not arrive at each site.

Hereinafter, the explanation will be given below regarding a flow in the router 200 from a packet's being inputted from an input line 201 until the packet's being outputted to an output line 202. When a packet is inputted from the input line 201, an internal-header addition unit 510 of the packet reception unit 230 illustrated in FIG. 10 adds the internal header unit 330 to the packet. Next, the internal-header addition unit 510 counts byte length of the packet, then writing the counted byte length into the packet length 331, and writing the number of the input line 201 into which the packet has been inputted into the input line number 332. Moreover, the unit 510 accumulates the packet into a packet temporary-accumulation buffer 520.

Furthermore, a packet-header transmission unit 550 transmits, as packet-header information 21-*i* (i=1~N), the information on the header unit 310 and the internal header unit 330 to the route judgment unit 221 of the header processing unit 220. Incidentally, at this time, values of the output line information 333 and the site number information 334 become the values with no meaning. In FIG. 2, the illustration is given in such a manner that only the interface unit 210-1 transmits the packet-header information 21-1, for, otherwise, the drawing becomes complicated. However, all of the interface units 210-*i* (i=1~N) transmit the packet-header information 21-*i* (i=1~N).

If the DIP 312 of the received packet indicates a unicast packet, the route judgment unit 221 judges the number (hereinafter, referred to as "output line number") of an output line and the site number, i.e., an identifier of the site existing in the downstream of the output line, from the information on the DIP 312 in the received packet-header information 21-*i*. Meanwhile, if the DIP 312 of the received packet indicates a multicast packet, the route judgment unit 221 judges one or plural output line numbers and the site numbers of sites existing in the downstream of the one or plural output lines from the information on the SIP 311 and the DIP 312. In the case of, e.g., the multicast IP address of IPv4, the DIP 312 becomes the format illustrated in FIG. 4. The front-positioned 4 bits of the 32-bit IPv4 address is the fixed '1110'. Making reference to these bits allows the route judgment unit 221 to judge the multicast packet. The group of the multicast packet is described in the subsequent 28 bits of the 32-bit IPv4 address. At the time of inputting the multicast packet, the route judgment unit 221 makes a comparison between the SIP 311 and the DIP 312 of the multicast packet and the SIP 701 and the DIP 702 stored in the entry 710 of the multicast routing table 700 (FIG. 6). Then, the route judgment unit 221 transmits, as packet output line information 22-*i* and packet output site information 23-*i*, the output line information 703 and the output site information 704 within an entry 710 in which the coincidence holds to a packet reception unit 230-*i* corresponding to the received packet-header information 21-*i*. Incidentally, in FIG. 2, only the packet output line information 22-1 and packet output site information 23-1 are illustrated, for, otherwise, the drawing becomes complicated. However, there exist the packet output line information 22-*i* and packet output site information 23-*i* which are directed and outputted to the respective interface units 210-*i* (i=1~N).

A header write circuit 560 of the packet reception unit 230 sets the packet output line information 22 and the packet output site information 23 into the output line information 333 and the site number information 334. Moreover, a packet read circuit 530 reads the present packet from the packet temporary-accumulation buffer 520, then transmitting the packet to the switch unit 250.

Having received the packet, the switch unit 250 transmits the packet to the packet transmission unit 240 of the interface unit 210 corresponding to each bit of the output line information 333. If a plurality of bits of the output line information 333 are found to be '1', the switch unit 250 copies and transmits the packet to the corresponding packet transmission units 240.

Figure 11:
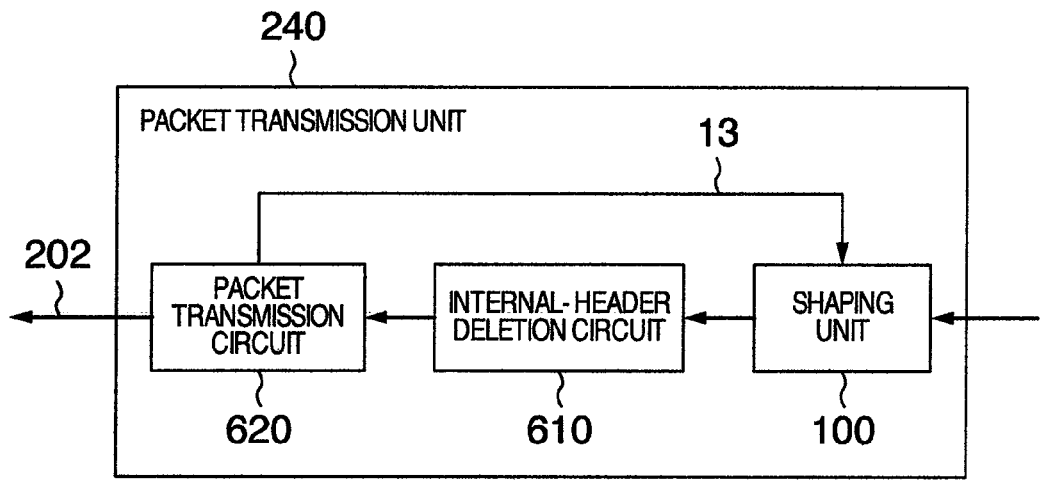
FIG. 11 illustrates an embodiment of a configuration of a packet transmission unit 240.

FIG. 11 illustrates the details of the packet transmission unit 240. This packet transmission unit 240 includes a shaping unit 100, an internal-header deletion circuit 610, and a packet transmission circuit 620. From the site number information 334, the shaping unit 100 recognizes that the sites to which the multicast packet will be finally transferred are the branch-office site A903 and the branch-office site B904. Then, the shaping unit 100 transmits the packets to the internal-header deletion circuit 610 in such a manner that the bandwidth of the packet from the carrier network 901 to the branch-office site A903 and the bandwidth of the packet from the carrier network 901 to the branch-office site B904 are controlled at values lower than 10 Mbps and 5 Mbps, respectively.

The internal-header deletion circuit 610, which has received these packets, deletes the internal header unit 330 from the packets, then transmitting the packets to the packet transmission circuit 620. The packet transmission circuit 620 transmits the received packets to the output line 202.

Detailed Operation of the Shaping Unit

Figure 1:
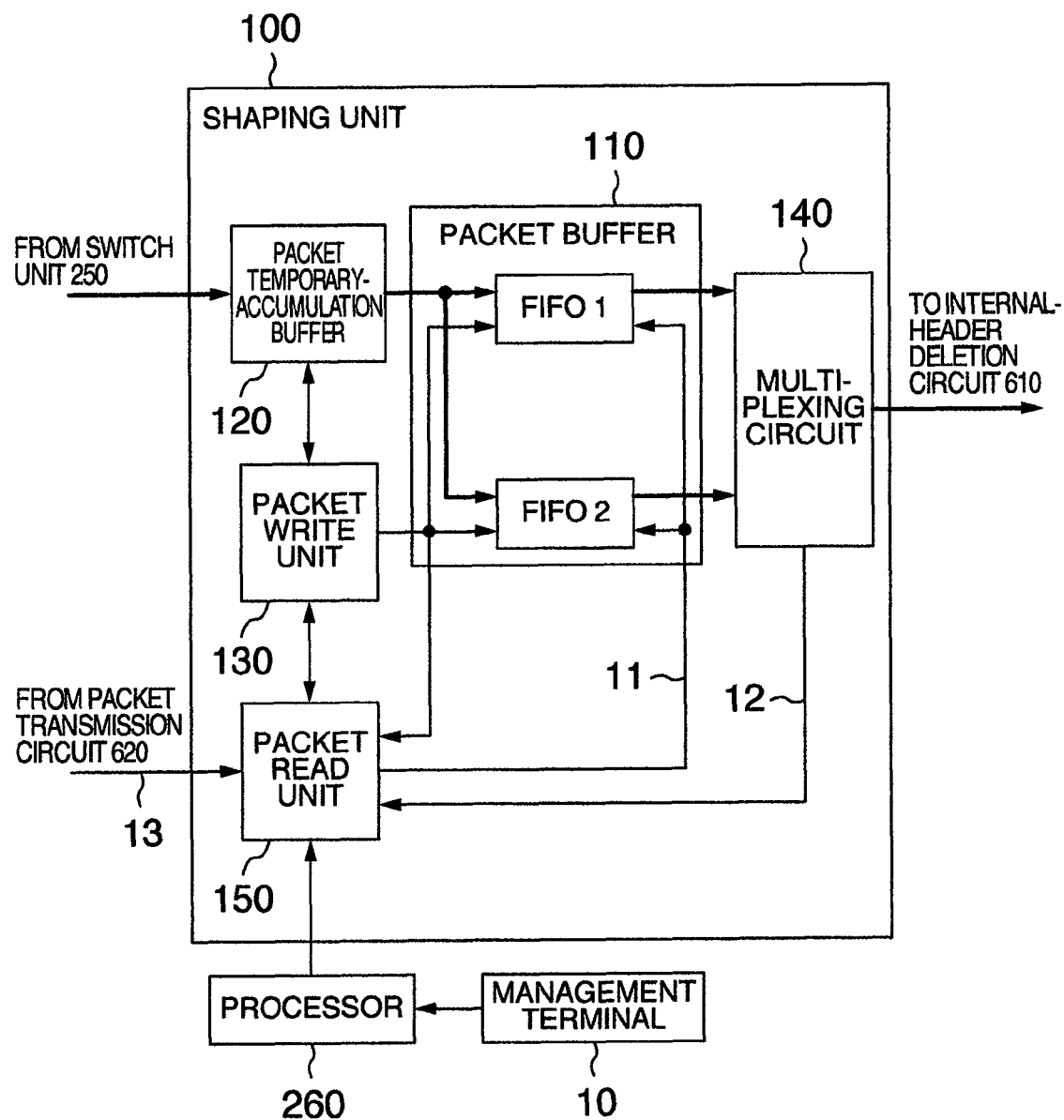
FIG. 1 illustrates an embodiment of a configuration of a shaping unit 100.

Hereinafter, referring to FIG. 1, the explanation will be given below concerning the operation of the shaping unit 100 which is characteristics of the present invention. The shaping unit 100 illustrated in FIG. 1 includes a packet buffer 110 including a site-1-designed FIFO 1 and a site-2-designed FIFO 2 for accumulating packets, a packet temporary-accumulation buffer 120 for temporarily accumulating the packets to be written into the buffer 110, a packet write unit 130 for writing the packets into the buffer 110, a packet read unit 150 for reading the packets from the buffer 110, and a multiplexing circuit 140 for multiplexing the packets read from the FIFO 1 and the FIFO 2, and transmitting a resultant multiplexed packet to the internal-header deletion circuit 610. In the present embodiment, the explanation will be given regarding a case where the FIFO 1 and the FIFO 2 respectively correspond to the branch-office site A903 and the branch-office site B904.

In the present embodiment, the description has been given assuming following case: The number of sites at which a packet on each output line copied in the downstream will arrive is two at the maximum. In a case where the number of the sites is three or more, it is advisable enough for the shaping unit 100 to include a larger number of FIFOs. Then, the route judgment unit 221 judges the three or more sites for each output line 202.

The processing in the shaping unit 100 includes a packet write processing at the time of receiving a packet from the switch unit 250, and writing the packet into the buffer 110, and a packet read processing at the time of reading the packet from the buffer 110, and transmitting the packet to the internal-header deletion circuit 610. Hereinafter, the explanation will be given below regarding the details of these processings.

Packet Write Processing

Figure 12:
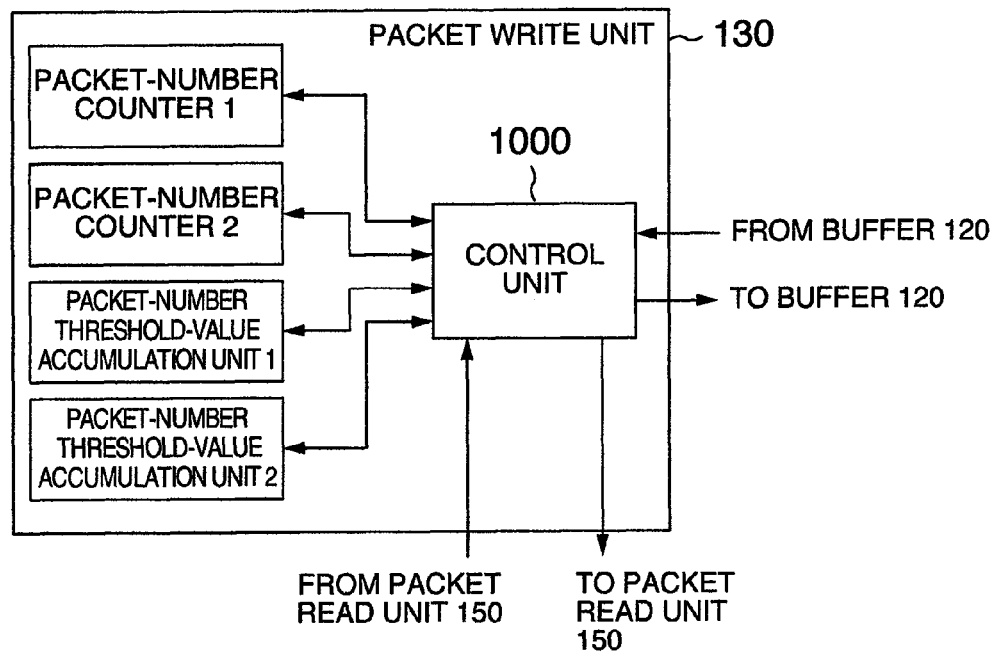
FIG. 12 illustrates an embodiment of a configuration of a packet write unit 130.

The present processing is a one performed mainly by the packet write unit 130. Having received a packet from the switch unit 250, the packet temporary-accumulation buffer 120 accumulates the packet, then transmitting, to the packet write unit 130, the site number information 334 corresponding to the output line of the packet of the internal header unit 330. FIG. 12 illustrates the details of the packet write unit 130. The packet write unit 130 includes packet-number counters 1 and 2 for counting the numbers of the packets accumulated in the FIFO 1 and the FIFO 2, packet-number threshold-value accumulation units 1 and 2 for storing respective threshold values of the numbers, and a control unit 1000. Hereinafter, the explanation will be given below, classifying the present processing into a case where the received packet is a virtual multicast packet and a case where the received packet is not the virtual multicast packet.

The Received Packet is not the Virtual Multicast Packet

Having been informed of the site number information 334 from the packet temporary-accumulation buffer 120, the control unit 1000 of the packet write unit 130 reads the counter value within the packet-number counter corresponding to the site number information 334 and the threshold value of the packet-number threshold-value accumulation unit corresponding thereto. If the counter value≦the threshold value is found to hold, the packet within the packet temporary-accumulation buffer 120 is written into the FIFO corresponding to the site number information 334, then incrementing the corresponding packet-number counter by "1". Meanwhile, if the counter value≦the threshold value is found to hold, the packet within the packet temporary-accumulation buffer 120 is not written into the FIFO. At this time, the packet within the buffer 120 is written over the subsequent packet finally, thereby being discarded.

The Received Packet is the Virtual Multicast Packet

Having been informed of the site number information 334 from the packet temporary-accumulation buffer 120, the control unit 1000 of the packet write unit 130 transmits, to the packet read unit 150, a transmission request for transmitting the maximum bandwidth information on sites in which the bit of the site number information 334 is equal to '1'. The maximum bandwidth to the site 1 (the branch-office site A) and the maximum bandwidth to the site 2 (the branch-office site B): 10 Mbps and 5 Mbps each, are set into the packet read unit 150. Then, the packet read unit 150 transmits, to the packet write unit 130, the values (10 Mbps, 5 Mbps) corresponding to the sites on which the transmission request has been made. Having received the maximum bandwidth for each site from the packet read unit 150, the control unit 1000 judges that the site whose maximum bandwidth is smaller (i.e., the branch-office site B904 in FIG. 3) is the first site, then reading the counter value within the packet-number counter corresponding to the first site and the threshold value of the packet-number threshold-value accumulation unit corresponding thereto. If the maximum bandwidths are the same, the control unit 1000 judges that the site 1 is the first site.

If the relation of the counter value≦the threshold value is found to exist between the counter value and threshold value thus read, the packet within the packet temporary-accumulation buffer 120 is written into the first FIFO corresponding to the first site, then incrementing the packet-number counter of the first site by "1". Meanwhile, if the counter value>the threshold value is found to exist, the packet within the packet temporary-accumulation buffer 120 is not written into the FIFO. At this time, the packet within the buffer 120 is written over the subsequent packet finally, thereby being discarded.

In the present embodiment, the reason why the packet is written into the first site whose maximum bandwidth is smaller is as follows: If the virtual multicast packet is accumulated into the FIFO of the site whose maximum bandwidth is larger, in some cases, the virtual multicast packet by the amount of the maximum bandwidth of this FIFO is transmitted. On this occasion, this virtual multicast packet is copied at the switch 900. As a result, it turns out that the bandwidth to the branch-office site whose maximum bandwidth is smaller will exceed the maximum bandwidth.

Packet Read Processing

Figure 13:
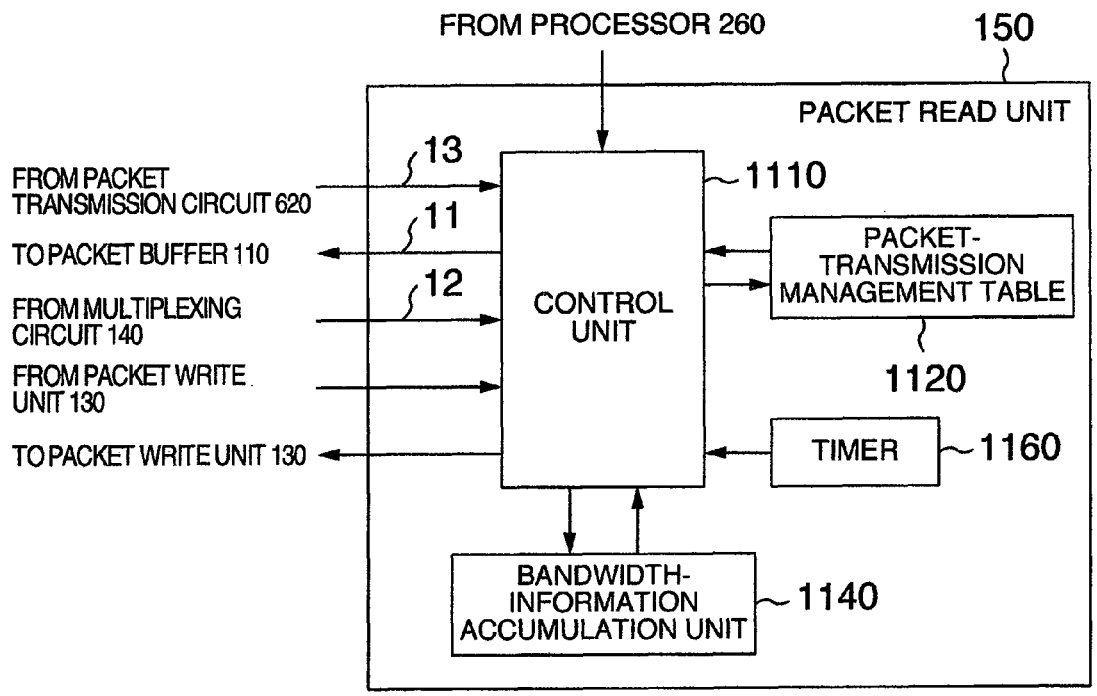
FIG. 13 illustrates an embodiment of a configuration of a packet read unit 150.
Figure 14:
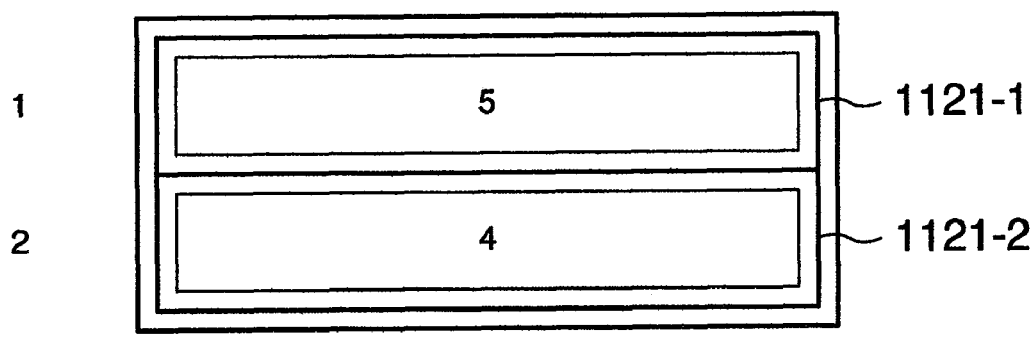
FIG. 14 illustrates an embodiment of a configuration of a packet-transmission management table 1120.
Figure 15:
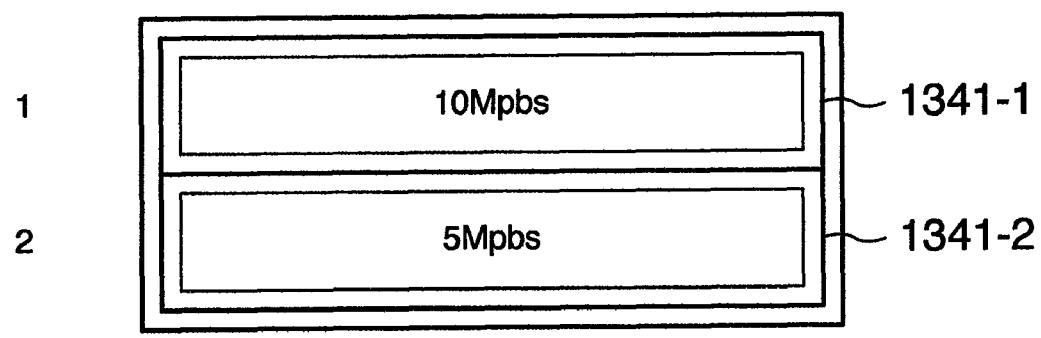
FIG. 15 illustrates an embodiment of a configuration of a bandwidth-information accumulation unit 1140.

The present processing is a one performed mainly by the packet read unit 150 illustrated in FIG. 13. The packet read unit 150 includes a control unit 1110, a packet-transmission management table 1120 illustrated in FIG. 14 and used for storing transmission point-in-time of the next packet (next-packet transmission point-in-time) for each site, a bandwidth-information accumulation unit 1140 illustrated in FIG. 15 and used for storing the maximum bandwidth for each site, and a timer 1160 for storing the present point-in-time.

Figure 16:
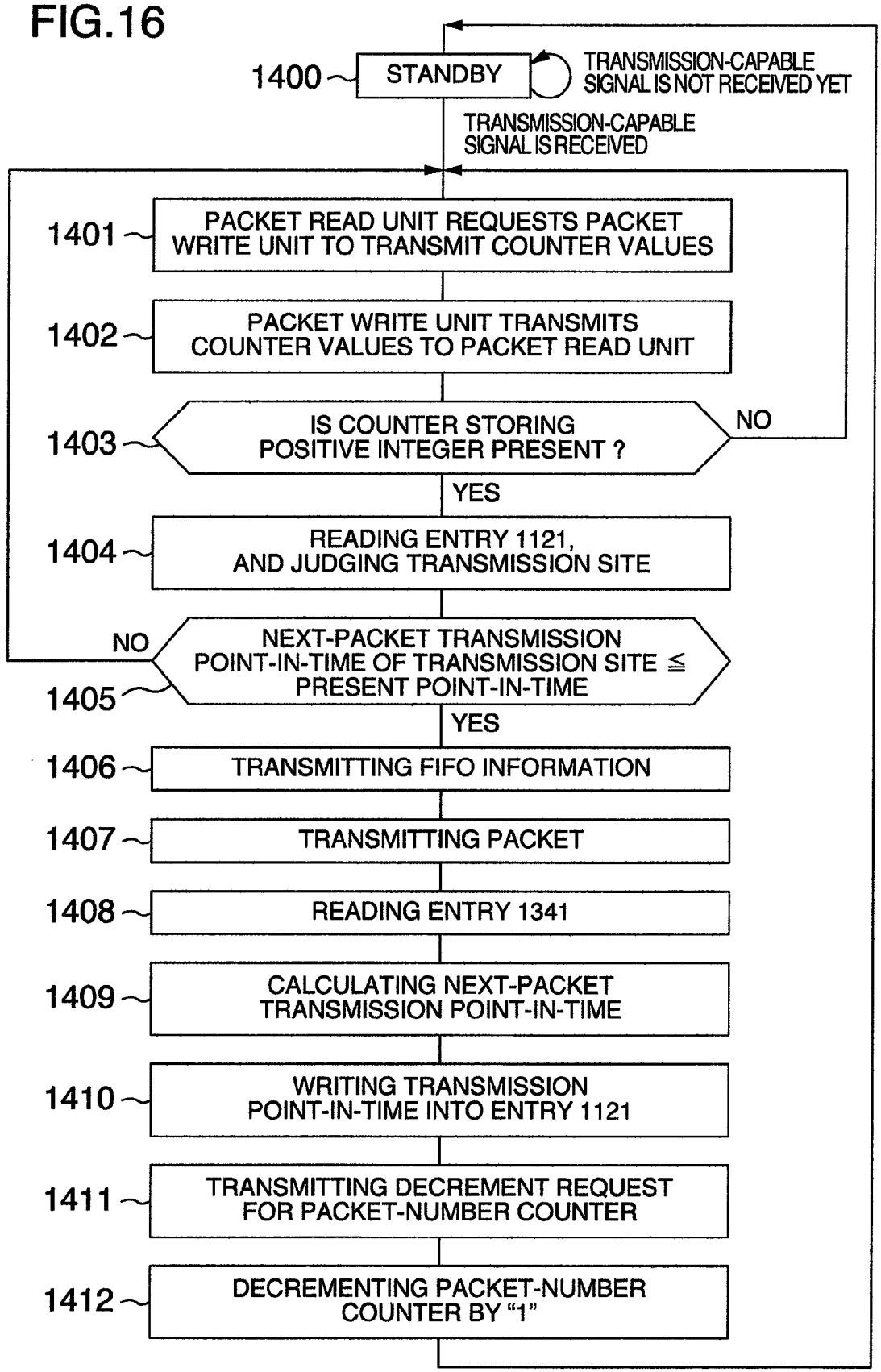
FIG. 16 illustrates a flowchart for the packet read unit 150.

Hereinafter, referring to a flowchart illustrated in FIG. 16, the explanation will be given below concerning the packet read processing. The present processing is started by the packet read unit 150's receiving a transmission-capable signal 13, which is transmitted by the packet transmission circuit 620 illustrated in FIG. 11. The transmission-capable signal 13 is information for indicating that a packet can be transmitted to the output line 202 corresponding to the packet transmission circuit 620. Having received the present signal 13, the control unit 1110 of the packet read unit 150 transmits, to the packet write unit 130, a transmission request for transmitting the counter values stored in the packet-number counters 1 and 2, i.e., the numbers of the packets accumulated in the FIFOs 1 and 2 (step 1401). The control unit 1000 of the packet write unit 130, which has received the present request, transmits the counter values of the packet-number counters 1 and 2 to the packet read unit 150 (step 1402).

The control unit 1110 of the packet read unit 150 checks the presence or absence of a packet-number counter which stores a positive integer, thereby judging the presence or absence of a site in which the packets are accumulated (step 1403). If the judgment result is found to be "present", the control unit 1110 reads each entry 1121 of the packet-transmission management table 1120 corresponding to the site which has been judged to be "present". Then, the control unit 1110 judged, as being a "transmission site", a site whose next-packet transmission point-in-time is the earliest (i.e., whose next-packet transmission point-in-time is the smallest) (step 1404). For example, when the next-packet transmission points-in-time are the ones illustrated in FIG. 14, if the judgment result of both of the sites 1 and 2 is found to be "present", the site 2 whose next-packet transmission point-in-time is earlier is judged as being the "transmission site". Also, if the judgment result of one of the sites 1 and 2 is found to be "present", the site which has been judged to be "present" is judged as being the "transmission site". If the judgment result of both sites is found to be "absent", the control unit 1110 is maintained on standby until either of the counter values changes from '0' to a positive integer due to the above-described packet write processing. This standby is implemented by the shaping unit 100's executing the steps 1401, 1402, and 1403 once again.

Next, the control unit 1110 makes a comparison between the present point-in-time indicated by the timer 1160 and the next-packet transmission point-in-time of the transmission site (step 1405). Then, if the next-packet transmission point-in-time≦the present point-in-time (i.e., the next-packet transmission point-in-time is the present point-in-time or a past point-in-time) is found to hold, the control unit 1110 notifies the packet buffer 110 of the judged transmission site as packet-transmission FIFO information 11 (step 1406). Moreover, the FIFO corresponding to the packet-transmission FIFO information 11 reads a front-positioned packet (i.e., of the accumulated packets, a packet which had arrived at the FIFO in the farthest past), then transmitting the front-positioned packet to the multiplexing circuit 140. The multiplexing circuit 140 transmits the packet to the internal-header deletion circuit 610, and simultaneously transmits the packet length 331 and the site number information 334 of the internal header unit 330 to the packet read unit 150 as transmission packet-length information 12 (step 1407).

In this way, based on the next-packet transmission point-in-time, the packet read unit 150 adjusts a timing with which a packet is to be read from the FIFO of the packet buffer 110. This timing adjustment allows the total bandwidths to be controlled at the set bandwidths.

Meanwhile, if the next-packet transmission point-in-time>the present point-in-time (i.e., the next-packet transmission point-in-time is a point-in-time in the future) is found to hold, the control unit 1110 is required to be maintained on standby until the next-packet transmission point-in-time has elapsed.

During this standby time, in some cases, packets are accumulated into the FIFOs by the packet write processing, and thus the counter value of the packet-number counter 1 or 2 changes from '0' to a positive integer. At this time, there is a possibility that the transmission site whose next-packet transmission point-in-time is the earliest may change. For example, consideration is given to a case where the counter values of the packet-number counters 1 and 2 are respectively equal to 3 and 0, and where the stored values of the packet-transmission management table 1120 are respectively equal to the ones illustrated in FIG. 14. The value of the timer 1160 is equal to 2.

Accordingly, if a packet to the site 2 is inputted while the packet output to the site 1 is maintained on standby, the site 2 whose next-packet transmission point-in-time is earlier becomes the transmission site. In order to deal with the situation like this, if the next-packet transmission point-in-time>the present point-in-time is found to hold, the steps 1401 to 1405 are carried out once again. During the loop from the step 1401 to the step 1405, the next-packet transmission point-in-time will have elapsed, and thus the steps 1406 and 1407 are terminated.

Next, the control unit 1110 reads, from the bandwidth-information accumulation unit 1140, an entry 1341 corresponding to a site in which the bit of the site number information 334 is equal to '1' (step 1408). If the packet to be transmitted is a virtual multicast packet, it turns out that an entry 1341-1 and an entry 1341-2 will be read. Accordingly, in the case of the virtual multicast packet, it turns out that the control unit 1110 will read not only the bandwidth information on the site corresponding to the FIFO in which the packets are actually accumulated, but also the bandwidth information on all of the sites at which the virtual multicast packet will arrive. Next, the control unit 1110 calculates the next-packet transmission point-in-time for each site, which is determined from the maximum bandwidth j of the read site j (j=1, 2) and the packet length (Byte) within the transmission packet-length information 12 received from the multiplexing circuit 140 (step 1409). The next-packet transmission point-in-time j (novel), i.e., the new next-packet transmission point-in-time j for the site j, is represented by the following Expression 1 which uses the next-packet transmission point-in-time j (present), i.e., the present next-packet transmission point-in-time j:

next-packet transmission point-in-time $j$(novel)=max (present point-in-time, next-packet transmission point-in-time $j$(present))+packet length (Byte)×8/ maximum bandwidth $j$(bit/second)    (Expression 1)

Here, the explanation will be given below regarding the reason why the present point-in-time and the next-packet transmission point-in-time j (present) are described in terms of the max as in Expression 1. Assuming that the packet to be transmitted is a virtual multicast packet, consideration is given to the next-packet transmission point-in-time j (novel) of the second FIFO (the site corresponding thereto is assumed to be the second site (branch-office site A903 in FIG. 3)) which does not transmit the packet at the present point-in-time. If the transmission packet is an ordinary packet, the control unit 1110 is not required to recalculate the next-packet transmission point-in-time j (novel) of the second FIFO which does not transmit the packet at the present point-in-time. In the case of the virtual multicast packet, however, the control unit 1110 calculates the next-packet transmission point-in-time j (novel) as if the packet had been transmitted from the second FIFO at the present point-in-time. This calculation is made in order to take into consideration the situation that the virtual multicast packet transmitted from the first FIFO will be copied at the switch 900 in the downstream for the purpose of being addressed to the second site. At this time, the present point-in-time is added to the term of max so that a packet interval is created. This packet interval is determined from the packet length of the virtual multicast packet transmitted from the first FIFO and the maximum bandwidth of the second site. Then, a point-in-time which is further in the further in the future from the present point-in-time by the amount of the above-described packet interval is defined as being the next-packet transmission point-in-time j (novel).

Also, the packet is transmitted from the first FIFO independently of the next-packet transmission point-in-time j (present) of the second FIFO. As a result, there might be a case where the next-packet transmission point-in-time j (present) of the second FIFO is further in the future than the present point-in-time. In this case, when seen from the viewpoint of the packet interval, it turns out that the packet is transmitted to the second site such that its transmission bandwidth has exceeded the maximum bandwidth. Accordingly, in order to suppress the transmission bandwidth, the next-packet transmission point-in-time j (present) is added to the term of max. The addition of the present term makes it possible to judge the new next-packet transmission point-in-time j (novel) not from the present point-in-time but from the next-packet transmission point-in-time j (present) which is further in the future. This addition finds it impossible to form the interval for each packet into the time interval determined from the maximum bandwidth and the packet length. This addition, however, finds it possible to suppress the transmission bandwidth in a longer-period time range under the maximum bandwidth.

Figure 17:
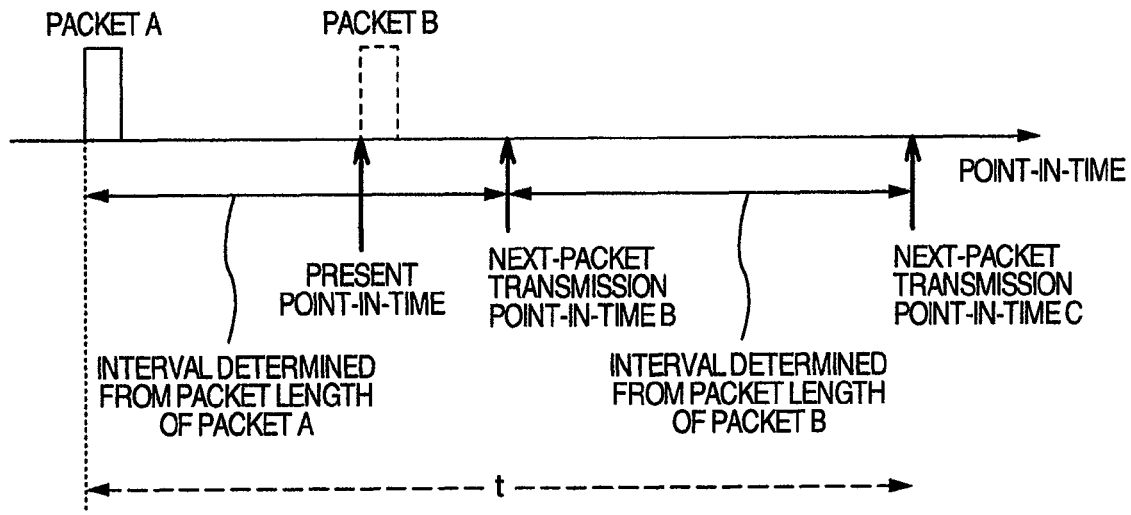
FIG. 17 illustrates a packet timing outputted from the shaping unit 100.
Figure 18:
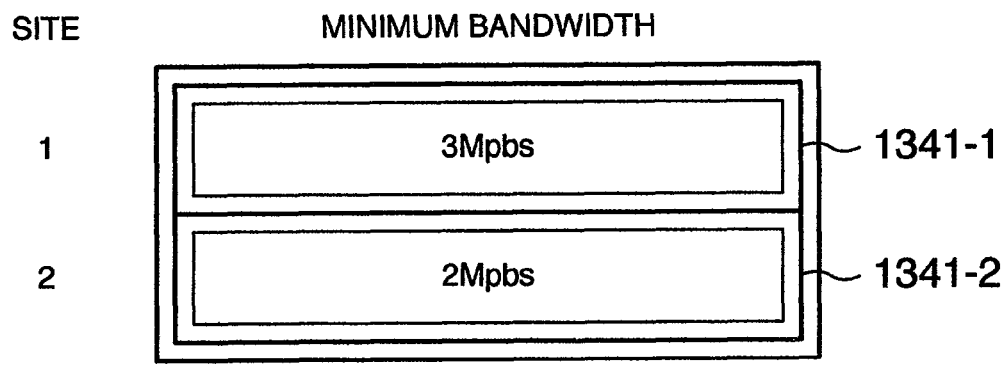
FIG. 18 illustrates an embodiment of the configuration of the bandwidth-information accumulation unit 1140.
Figure 19:
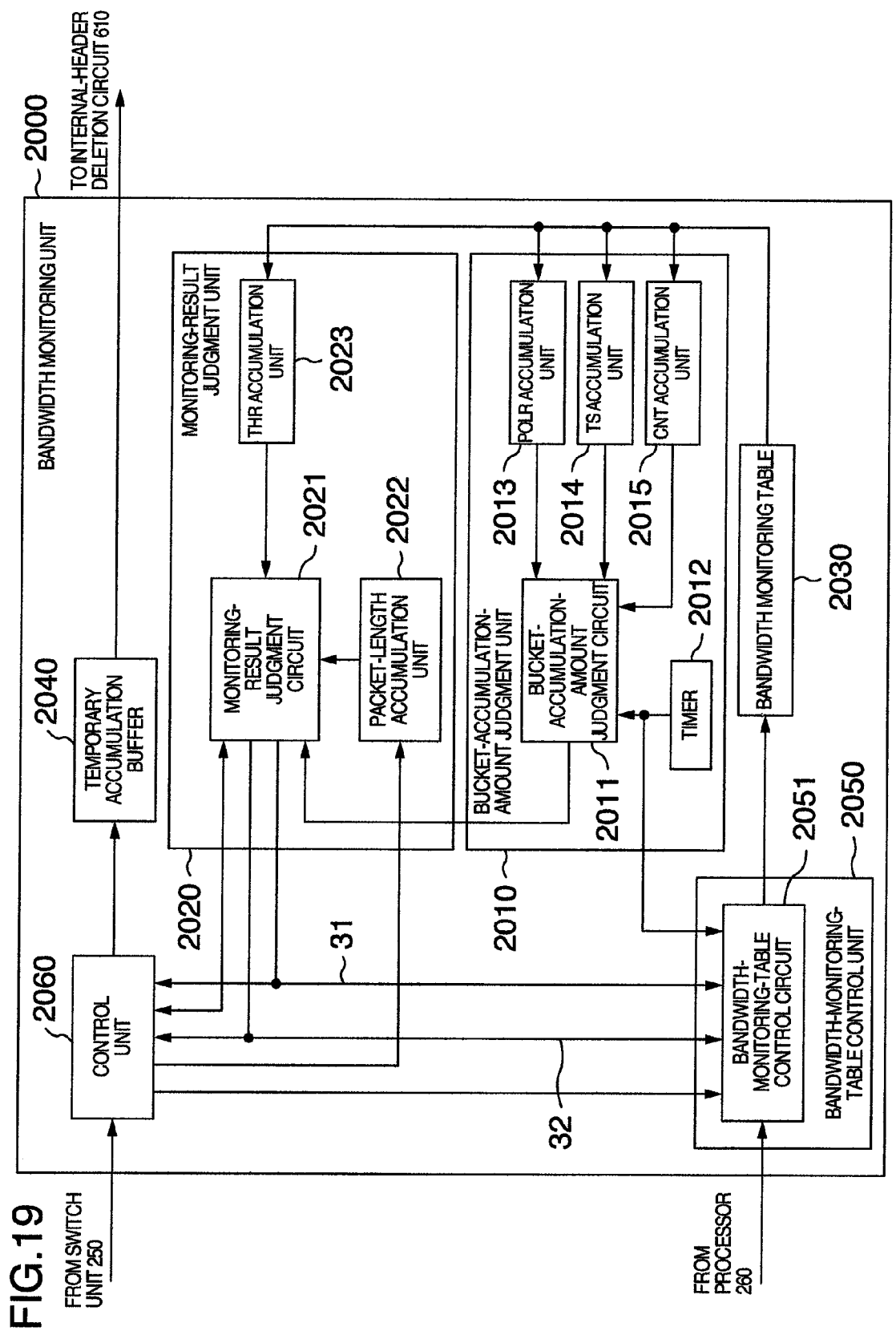
FIG. 19 illustrates an embodiment of a configuration of a bandwidth monitoring unit 2000.

Referring to FIG. 17, the explanation will be given below regarding a concrete example. In FIG. 17, a packet A is transmitted from the second FIFO, and a packet B (which is the virtual multicast packet that will be copied and arrive at the second site) is transmitted from the other first FIFO at the present point-in-time. The next-packet transmission point-in-time j of the second FIFO at the present point-in-time is a next-packet transmission point-in-time B which is further in the future than the present point-in-time. At this time, the calculation in accordance with the Expression 1 allows a next-packet transmission point-in-time C to be calculated as the next-packet transmission point-in-time (novel). Originally, when seen from the viewpoint of the second FIFO, observance of the maximum bandwidth requires that the packet B should be transmitted not at the present point-in-time but at the next-packet transmission point-in-time B, and the next packet should be transmitted at the next-packet transmission point-in-time C. If, however, the next-packet transmission point-in-time C is judged as being the next-packet transmission point-in-time (novel), the packet amount to be outputted during a time interval t can be suppressed under the maximum bandwidth, although the maximum bandwidth cannot be observed for each packet (it turns out that the point-in-time at which the packet B will be outputted is simply earlier).

In the foregoing explanation, the explanation has been given regarding the case where the packet is not actually transmitted from the second FIFO. With respect to the ordinary packet or the virtual multicast packet actually transmitted from the FIFO, however, the point-in-time which has elapsed from the present point-in-time by the amount of the interval corresponding to the maximum bandwidth and the packet length is defined as being the next-packet transmission point-in-time j (novel). This makes it possible to observe the maximum bandwidth. On account of the relation of the present point-in-time≧the next-packet transmission point-in-time (present), the use of the Expression 1 allows the next-packet transmission point-in-time j (novel) to be calculated.

After the calculation of the next-packet transmission point-in-time j (novel), the new next-packet transmission point-in-time j is written back into the packet-transmission management table 1120 (step 1410). Finally, the control unit 1110 transmits, to the packet write unit 130, a decrement request for decrementing the packet-number counter corresponding to the FIFO transmitting the packet (step 1411). Then, the control unit 1000 of the packet write unit 130 decrements the counter value of the corresponding packet-number counter by "1" (step 1412).

As having been explained so far, when transmitting the virtual multicast packet from the FIFOs to certain sites, the packet read unit 150 in the present embodiment updates not only the next-packet transmission point-in-time of the FIFO which has actually transmitted the packet, but also the next-packet transmission point-in-time of the FIFO which is directed to another site. This makes it possible to control the total bandwidth such that the bandwidth of the packet amount which will be copied at the switch 900 in the downstream is taken into consideration. This control, further, allows the maximum bandwidths of the packets arriving at the branch-office site A903 and the branch-office site B904 to be suppressed under 10 Mbps and 5 Mbps respectively.

Namely, one point provided in the present embodiment is as follows: One virtual multicast packet is read and outputted from a FIFO such that the packet is controlled at the bandwidths (10 Mbps, 5 Mbps) which are set for each of a plurality of destinations (e.g., branch-office site A903 and branch-office site B904) at which the packet will arrive. Also, the present embodiment can also be grasped and understood by using the other expressions which are obtained by translating the above-described point. For example, explaining these expressions while referring to FIG. 3, when one virtual multicast packet outputted from one line (line 3) is outputted to a plurality of lines (line 1, line 2) connected to the line 3, the packet is read and outputted from a FIFO such that the packet is controlled at the bandwidths (10 Mbps, 5 Mbps) which are set for each of the plurality of lines (line 1, line 2). Otherwise, when one virtual multicast packet outputted from one line (line 3) is outputted to a plurality of destinations (branch-office site A903 and branch-office site B904) at which the packet will arrive via the line 3, the packet is read and outputted from a FIFO such that the packet is controlled at the bandwidths (10 Mbps, 5 Mbps) which are set for each of the plurality of destinations.

In the foregoing embodiments, the explanation has been given concerning the case where the bandwidth information is the maximum bandwidth for each site. The other bandwidth information, however, is conceivable, such as, e.g., minimum bandwidth for each site. At this time, if a redundancy exists in the bandwidth of the output line 202 while a packet is being transmitted with the minimum bandwidth for each site ensured, the packet is transmitted in a manner of exceeding the minimum bandwidth.

The bandwidth-information accumulation unit 1140 of the shaping unit 100 for ensuring the minimum bandwidth stores, into the entry 1341, the minimum bandwidth instead of the maximum bandwidth. In a case of the set values in FIG. 18, the minimum bandwidths of the site 1 and the site 2 are equal to 3 Mbps and 2 Mbps, respectively. Based on the following Expression 2, the shaping unit 100 calculates the next-packet transmission point-in-time j at the step 1409.

next-packet transmission point-in-time j(novel)=max (present point-in-time, next-packet transmission point-in-time j(present))+packet length(Byte)×8/ minimum bandwidth j(bit/second)          (Expression 2)

Moreover, in order to output the packet when a redundancy exists in the bandwidth for each site, at the step 1405, the processing proceeds to the step 1406 regardless of the value of the next-packet transmission point-in-time j. The modification of the step 1405 allows the redundancy amount to be distributed based on the ratio of the minimum bandwidths for the respective sites.

Also, the shaping unit 100 in the present embodiment finds it possible to implement the WFQ (Weighted Fair Queuing) scheme for distributing the total bandwidth of the output line 201 on the basis of the weight W for each site. As described earlier, the shaping unit 100, where the minimum bandwidths are described into the bandwidth-information accumulation unit 1140 in the present embodiment, allocates the line bandwidths to the respective sites with the ratio of the minimum bandwidths for the respective sites. On account of this, arbitrary bandwidths which are proportional to the weights W for the respective sites are set as the values of the minimum bandwidths to be set into the bandwidth-information accumulation unit 1140. This setting allows the shaping unit 100 to implement the WFQ scheme.

Embodiment Having a Bandwidth Monitoring Unit

In the foregoing embodiments, the explanation has been given regarding the one embodiment of the shaping unit 100 which includes the buffer. In order to control the bandwidth from the carrier network 901 to the branch-office site A and the bandwidth from the carrier network 901 to the branch-office site B, the route 200 is also allowed to include a bandwidth monitoring unit 2000 illustrated in FIG. 19 in substitution for the shaping unit 100. The bandwidth monitoring unit 2000 monitors the bandwidth of a packet attaining to each site. Then, if the bandwidth to the branch-office site A and the bandwidth to the branch-office site B exceed 10 Mbps and 5 Mbps, respectively, the bandwidth monitoring unit 2000 discards the packet, thereby controlling the bandwidths to the respective sites under the contract bandwidths.

Hereinafter, referring to FIG. 16 through FIG. 21, the explanation will be given below concerning the detailed operation of the bandwidth monitoring unit 2000. As an algorithm for the bandwidth monitoring of the bandwidth monitoring unit 2000, an algorithm is used which is obtained from extending the continuous-state Leaky Bucket Algorithm (hereinafter, referred to as "Leaky Bucket Algorithm") to an algorithm for the bandwidth monitoring of a variable-length packet. Here, Leaky Bucket Algorithm is a monitoring algorithm for monitoring a cell, i.e., a fixed-length packet. Leaky Bucket Algorithm is based on the leakage-bucket model, into which a hole having a certain depth is bored. In the leakage-bucket model, while water exists in the bucket, the water leaks in the monitored bandwidth. Meanwhile, at the time of cell arrival, water by the amount of one cell is poured into the bucket. The bucket has the depth in order to tolerate arrival fluctuation of the cell. Unless the water overflows from the bucket, the inputted cell is judged as being an observance cell; whereas, if the water overflows therefrom, the inputted cell is judged as being a violation cell. In the present embodiment, the bandwidth monitoring of a variable-length packet is implemented by making variable the amount of the water to be poured into the bucket at the time of cell arrival.

The bandwidth monitoring unit 2000 for executing the bandwidth monitoring according to the present algorithm includes a bandwidth-monitoring-table control unit 2050, a bucket-accumulation-amount judgment unit 2010, a monitoring-result judgment unit 2020, a bandwidth monitoring table 2030, a temporary accumulation buffer 2040, and a control unit 2060.

Figure 20:
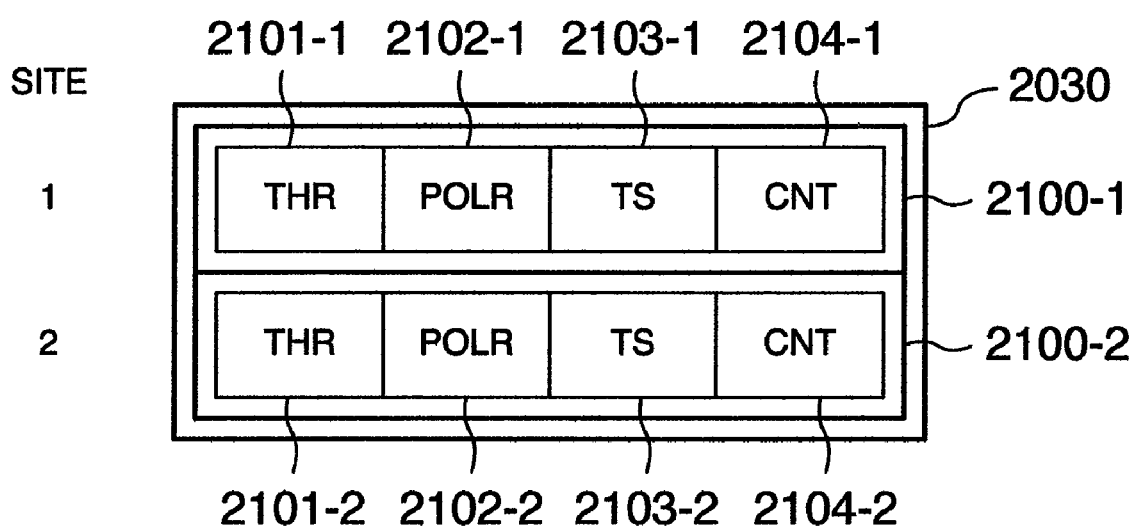
FIG. 20 illustrates an embodiment of a configuration of a bandwidth monitoring table 2030.

FIG. 20 illustrates format of the bandwidth monitoring table 2030. The bandwidth monitoring table 2030 includes bandwidth-monitoring control information 2100-$k$ ($k$=1~2) for each site. The bandwidth monitoring unit 2000 executes the bandwidth monitoring of one site by using the one piece of bandwidth-monitoring control information 2100-$k$. The bandwidth-monitoring control information 2100-$k$ includes THR 2101-$k$ (Byte) (Threshold) corresponding to the volume of the bucket, POLR 2102-$k$ (Byte/sec) (Policing Rate) being the rate at which the water leaks from the bucket, and representing the maximum bandwidth, point-in-time TS 2103-$k$ (sec) (Time Stamp) at which the water corresponding to the arrival packet is accumulated into the bucket last time, and CNT 2104-$k$ (Byte) (Count) corresponding to the water amount accumulated in the bucket.

Figure 21:
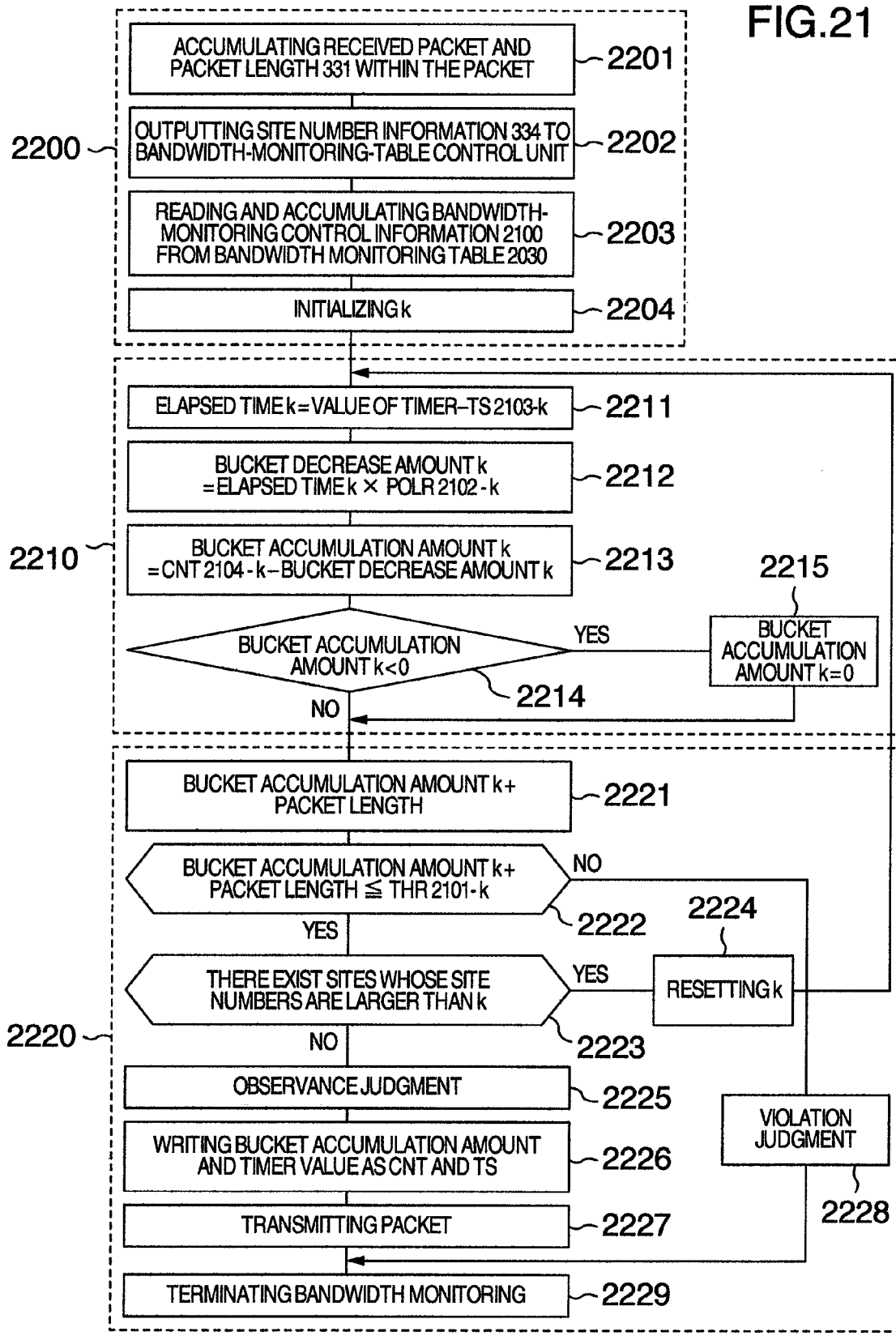
FIG. 21 illustrates a flowchart for the bandwidth monitoring unit 2000.

FIG. 21 illustrates a flowchart for the bandwidth monitoring unit 2000. The processing performed by the bandwidth monitoring unit 2000 includes a bandwidth-monitoring start processing 2200, a bucket-accumulation-amount judgment processing 2210, and a monitoring-result judgment processing 2220. The latter two processings are mainly executed by the bucket-accumulation-amount judgment unit 2010 and the monitoring-result judgment unit 2020, respectively.

Having received an ordinary packet or virtual multicast packet, the control unit 2060 of the bandwidth monitoring unit 2000 accumulates the packet into the temporary accumulation buffer 2040. Moreover, the control unit 2060 accumulates the information on the packet length 331 into the packet-length accumulation unit 2022 of the monitoring-result judgment unit 2020 (step 2201). Next, the control unit 2060 transmits the site number information 334 to the bandwidth-monitoring-table control circuit 2051 of the bandwidth-monitoring-table control unit 2050 (step 2202).

Having received the site number information 334, the bandwidth-monitoring-table control circuit 2051 reads the bandwidth-monitoring control information 2100 as the address of the bandwidth monitoring table 2030 of the site number corresponding to the bit of being equal to '1'. Then, the control circuit 2051 accumulates the THR 2101 into the THR accumulation unit 2023 of the monitoring-result judgment unit 2020, and accumulates the POLR 2102, the TS 2103, and the CNT 2104 into the POLR accumulation unit 2013, the TS accumulation unit 2014, and the CNT accumulation unit 2015 of the bucket-accumulation-amount judgment unit 2010, respectively (step 2203). If the packet which the bandwidth monitoring unit 2000 has received is the ordinary packet, only the one piece of bandwidth-monitoring control information 2100 is read and accumulated. Meanwhile, if the packet which the bandwidth monitoring unit 2000 has received is the virtual multicast packet, the two pieces of bandwidth-monitoring control information 2100 are read and accumulated. Finally, the control unit 2060 sets the counter value which the control unit 2060 includes: k at the value of the smallest site number of the sites in which the bit of the received site number information 334 is equal to '1' (step 2204).

In the bucket-accumulation-amount judgment processing 2210, the bucket-accumulation-amount judgment unit 2010 judges the water amount accumulated in the bucket immediately before the packet was inputted (i.e., bucket accumulation amount). First, the bucket-accumulation-amount judgment circuit 2011 calculates a difference between the value (whose unit is sec) of the timer 2012 for counting the present point-in-time and the TS 2103-$k$ (sec) within the TS accumulation unit 2014, thereby calculating an elapsed time k (sec) which has elapsed since the water was accumulated into the bucket last time (step 2211). Next, the circuit 2011 calculates the water amount which has leaked from the bucket since the water was accumulated into the bucket last time (i.e., bucket decrease amount k) (step 2212). This is performed by multiplying the elapsed time k (sec) by the POLR 2102-$k$ (Byte/sec) within the POLR accumulation unit 2013. Moreover, the circuit 2011 judges the bucket accumulation amount immediately before the packet was inputted (step 2213). This is performed by subtracting the bucket decrease amount k from the CNT 2104-$k$ (Byte) within the CNT accumulation unit 2015. Furthermore, the circuit 2011 judges whether the sign of the bucket accumulation amount k is positive or negative (step 2214). Then, if the judgment result is found to be negative, the circuit 2011 amends the bucket accumulation amount k into '0' (i.e., the bucket is empty) (step 2215).

In the monitoring-result judgment processing 2220, the monitoring-result judgment circuit 2021 of the monitoring-result judgment unit 2020 judges whether or not the water equivalent to the packet within the temporary accumulation buffer 2040 will be able to be poured into the bucket. First, the monitoring-result judgment circuit 2021 adds the packet length (Byte) to the bucket accumulation amount k (Byte) judged in the bucket-accumulation-amount judgment processing 2210 (step 2221). Next, the monitoring-result judgment circuit 2021 makes a comparison in largeness between the bucket volume THR 2101-$k$ accumulated in the THR accumulation unit 2023 and the value resulting from the above-described addition (step 2222). Then, if the bucket accumulation amount k+the packet length>the THR 2101-$k$ is found to hold, i.e., if the water overflows from the bucket, the circuit 2021 judges the packet accumulated in the temporary accumulation buffer 2040 as being a violation packet. Accordingly, the circuit 2021 transmits a bandwidth-monitoring result information 31 for indicating "violation" to the bandwidth-monitoring-table control circuit 2051 of the bandwidth-monitoring-table control unit 2050 (step 2228). Meanwhile, if the bucket accumulation amount k+the packet length<the THR 2101-$k$ is found to hold, the monitoring-result judgment circuit 2021 makes reference to the site number information 334 of the packet within the temporary accumulation buffer 2040. Then, if there exist sites in which the bit value is equal to '1', and whose site numbers are larger than the counter value within the control unit 2060: k, the circuit 2021 resets the smallest value of these site numbers at k (step 2224), then returning to the step 2211 to carry out the steps 2211 to 2223 once again. Meanwhile, if there exists none of the sites in which the bit value is equal to '1', and whose site numbers are larger than the counter value: k, the circuit 2021 judges the inputted packet as being an observance packet. Accordingly, the circuit 2021 transmits the bandwidth-monitoring result information 31 for indicating "observance" to the bandwidth-monitoring-table control circuit 2051 and the control unit 2060. Then, the circuit 2021 transmits the values of "the bucket accumulation amount m (m=1, 2)+the packet length" to the bandwidth-monitoring-table control circuit 2051 as bucket-accumulation-amount information 32-$m$ (m=1, 2) (step 2225). Having received the bandwidth-monitoring result information 31 for indicating "observance", the bandwidth-monitoring-table control circuit 2051 writes the values of the bucket-accumulation-amount information 32-$m$ (m=1, 2) and the value of the timer 2012 into the CNT 2104-$m$ (m=1, 2) and the TS 2103-$m$ (m=1, 2) of the bandwidth monitoring table 2030 as the bucket accumulation amount immediately after the bandwidth monitoring and the arrival point-in-time of the packet, respectively (step 2226). Furthermore, the control unit 2060 transmits the packet within the temporary accumulation buffer 2040 to the internal-header deletion circuit 610 (step 2227). On the other hand, when having received the bandwidth-monitoring result information 31 for indicating "violation", the bandwidth-monitoring-table control circuit 2051 executes none of the steps 2223 to 2227. At this time, the packet within the temporary accumulation buffer 2040 is written over the subsequent packet finally, thereby being discarded. When the above-described processing is terminated, the bandwidth monitoring is terminated (step 2229).

Based on the execution of the above-described processing, the judgment on the bandwidth monitoring result is made as follows: With respect to an ordinary packet, if the bandwidth of the packet falls within the contract bandwidth of an address site corresponding thereto, the packet is judged as being in "observance". Meanwhile, if the bandwidth falls outside the contract bandwidth, the packet is judged as being in "violation". On the other hand, with respect to a virtual multicast packet, if the bandwidths of the packet attaining to the site 1 and the site 2 fall within contract bandwidths, the packet is judged as being in "observance". Meanwhile, if the bandwidths of the packet attaining to both or either of the sites are larger than the contract bandwidths, the packet is judged as being in "violation".

As having been explained so far, the bandwidth monitoring unit 2000 of the present invention operations as follows: When an inputted packet is judged as being in "observance", at the step 2225, if the packet is an ordinary packet, the packet length is added to only the CNT 2104 of the site corresponding to the packet. If, however, the packet is a virtual multicast packet, the packet length is added to the CNT 2104 of the site 1 and that of site 2. On account of this feature, when transmitting the virtual multicast packet, the bandwidth monitoring unit 2000 of the present invention behaves as if the unit 2000 had transmitted the packet to both sites while taking into consideration the virtual multicast packet which will be copied at the switch 900 in the downstream. As a result, the bandwidth of the packet from the carrier network 901 to the branch-office site A and the bandwidth of the packet from the carrier network 901 to the branch-office site B can be suppressed under 10 Mbps and 5 Mbps, respectively.

Static Setting Method for Output Site Information

Hereinafter, the explanation will be given below regarding a case where the manager of the router 200 sets the output site information 704 of the multicast routing table 700 from an external management terminal 10. In (1), the explanation has been given regarding the case where the output site information 704 is dynamically set using the join message. In the situation that the switch 900 is always making the multicast copy, however, there is no need of setting the output site information 704 dynamically. An occasion conceivable as the case like this is that, e.g., the switch 900 implements no snooping, and copies the multicast packet to transfer the copied packet to all the lines.

Figure 22:
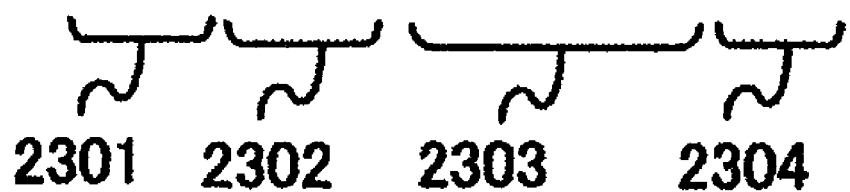
FIG. 22 illustrates an embodiment of a command for setting output site information 704 of the multicast routing table 700.

FIG. 22 illustrates an embodiment of a command to be inputted into the management terminal 10. This command: site_info is a command for setting the site number information of a certain output line within the entry 710 determined from a certain source IP address, destination IP address, and combination of these addresses. These SIP, DIP, output line, and site number information are described into 2301, 2302, 2303, and 2304, respectively. For example, the first-row command is a command for setting, into '11', the site number information corresponding to the output line number '1' from among the site number information within a certain entry 710 in which the source IP address and the destination IP address are the SIP 1 and the DIP 1 respectively. The processor 260, which has received the command, makes a comparison between the command-inputted SIP 2301 and DIP 2302 and the SIP 701 and the DIP 702 within the entry respectively, thereby confirming the coincidence therebetween. Then, the processor 260 sets, into the value of 2304 of the command, the site number information 704 corresponding to the output line described in 2303 within the entry 710 in which the coincidence holds.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A shaping device for outputting a received packet in such a manner that bandwidth of said received packet is controlled at a set bandwidth, said shaping device, comprising:
   a buffer unit for accumulating said received packet; and
   a packet read unit for reading said packet accumulated into said buffer unit; wherein
   said packet read unit reads said packet in such a manner that bandwidth of said packet is controlled at a bandwidth, said bandwidth being set for each of a plurality of destinations at which said one packet to be outputted will arrive;
   wherein, said buffer unit comprises at least a first FIFO corresponding to a first destination and a second FIFO corresponding to a second destination, a timing with which said packet is to be read from said first FIFO and said second FIFO being adjusted by said packet read unit,
   said packet read unit retains a first next-packet transmission point-in-time to said first destination and a second next-packet transmission point-in-time to said second destination calculated based on said bandwidth set for each of said first destination and said second destination,
   said packet read unit reading said packet from said first FIFO and said second FIFO based on said first next-packet transmission point-in-time and said second next-packet transmission point-in-time;
   if said received packet is a multicast packet which will arrive at said first destination and said second destination,
   said buffer unit accumulates said multicast packet into said first FIFO,
   when said packet read unit has read said multicast packet from said first FIFO,
   said packet read unit calculates a next-packet transmission point-in-time of a first packet, said first packet being accumulated in said first FIFO, to be read next, and further,
   said packet read unit modifies a third next-packet transmission point-in-time of a second packet to a fourth next-packet transmission point-in-time, said second packet being accumulated in said second FIFO, to be read next.

2. The shaping device according to claim 1, wherein,
   said modification performed by said packet read unit is performed based on said third next-packet transmission point-in-time, packet length of said multicast packet, and said bandwidth set for said second destination.

3. The shaping device according to claim 1, wherein
   said bandwidth set for each of said plurality of destinations includes a first bandwidth and a second bandwidth,
   said packet read unit reading said packet in such a manner that bandwidth of said packet is adjusted at said bandwidth which is smaller of said first bandwidth and said second bandwidth.

4. The shaping device according to claim 1, wherein,
   said bandwidth set for said first destination corresponding to said first FIFO into which said multicast packet is accumulated is smaller than said bandwidth set for said second destination corresponding to said second FIFO.

5. A router device connected to a network, and designed for transferring a packet to another network, said packet being received from said network, said router device, comprising:
   a reception unit for receiving said packet;
   a route judgment unit for judging an output line of said packet received at said reception unit, and a destination at which said packet will arrive;
   a buffer unit for accumulating said received packet; and
   a transmission unit for transmitting said packet from said output line judged by said route judgment unit;
   wherein, said transmission unit transmits said packet in such a manner that bandwidth of said packet is controlled at a bandwidth, said bandwidth being set for each of a plurality of destinations at which said one packet to be transmitted will arrive,
   said transmission unit comprises at least a first FIFO corresponding to a first destination and a second FIFO corresponding to a second destination,
   said transmission unit retains a first next-packet transmission point-in-time to said first destination and a second next-packet transmission point-in-time to said second destination calculated based on said bandwidth set for each of said first destination and said second destination,
   said transmission unit reading said packet from said first FIFO and said second FIFO based on said first next-packet transmission point-in-time and said second next-packet transmission point-in-time; and
   wherein, if said received packet is a multicast packet which will arrive at said first destination and said second destination,
   said buffer unit accumulates said multicast packet into said first FIFO,
   when said transmission unit has read said multicast packet from said first FIFO,
   said transmission unit calculating a next-packet transmission point-in-time of a first packet, said first packet being accumulated in said first FIFO, to be read next, and further,
   said transmission unit modifying a third next-packet transmission point-in-time of a second packet to a fourth next-packet transmission point-in-time, said second packet being accumulated in said second FIFO, to be read next.

6. The router device according to claim 5, wherein,
   said modification performed by said transmission unit is performed based on said third next-packet transmission point-in-time, packet length of said multicast packet, and said bandwidth set for said second destination.

7. The router device according to claim 5, wherein,
said bandwidth set for each of said plurality of destinations includes a first bandwidth and a second bandwidth,
said transmission unit transmitting said packet in such a manner that bandwidth of said packet is adjusted at said bandwidth which is smaller of said first bandwidth and said second bandwidth.

8. The router device according to claim 5, wherein,
said bandwidth set for said first destination corresponding to said first FIFO into which said multicast packet is accumulated is smaller than said bandwidth set for said second destination corresponding to said second FIFO.

* * * * *